United States Patent [19]

Okada

[11] Patent Number: 5,035,148
[45] Date of Patent: Jul. 30, 1991

[54] FORCE DETECTOR USING RESISTANCE ELEMENTS

[75] Inventor: Kazuhiro Okada, Ageo, Japan
[73] Assignee: Wacoh Corporation, Ageo, Japan
[21] Appl. No.: 470,102
[22] Filed: Jan. 25, 1990
[30] Foreign Application Priority Data Feb. 1, 1989 [JP] Japan .................................... 1-23121
Jun. 17, 1989 [JP] Japan .................................... 1-155032

[51] Int. Cl.⁵ .......................... G01L 5/16; G01L 1/22
[52] U.S. Cl. .............................. 73/862.04; 73/862.67; 338/005
[58] Field of Search ................ 73/862.04, 862.67, 777, 73/517 R, 862.68; 338/4, 5

[56] References Cited

U.S. PATENT DOCUMENTS

| | | | |
|---|---|---|---|
| 4,454,771 | 6/1984 | Shimazoe et al. | 73/862.68 |
| 4,812,199 | 3/1989 | Sickafus | 73/862.14 X |
| 4,884,051 | 11/1989 | Takahashi et al. | 338/4 |
| 4,905,523 | 3/1990 | Okada | 73/862.04 |

*Primary Examiner*—Charles A. Ruehl
*Attorney, Agent, or Firm*—Ladas & Parry

[57] ABSTRACT

A force detector for detecting forces exerted in axial directions or moments exerted about respective axes uses an origin as a working point in an XYZ three-axis coordinate system. Four bridge circuit portions on the upper surface of a substrate have resistance elements along positive and negative directions of the X and Y axes. The resistance elements have a property such that their electric resistances vary due to a mechanical deformation, and detection of a force is made by voltage variations so produced in the bridge circuits of the bridge circuit portions. A strain generative body is used in order to transmit an external force to the substrate. The strain generative body has a first flexible portion having a sufficient flexibility with respect to the Z axis direction and a second flexible portion having sufficient flexibility with respect to the directions perpendicular to the Z axis, thus permitting detection sensitivities with respect to each axis to be made uniform.

13 Claims, 25 Drawing Sheets

FIG. 5

| | R1 | R2 | R3 | R4 | R5 | R6 | R7 | R8 | R9 | R10 | R11 | R12 | R13 | R14 | R15 | R16 | R17 | R18 | R19 | R20 | R21 | R22 | R23 | R24 |
|---|---|---|---|---|---|---|---|---|---|---|---|---|---|---|---|---|---|---|---|---|---|---|---|---|
| Fx | + | + | + | + | + | + | + | − | o | o | − | + | − | − | − | − | − | − | − | + | o | o | + | − |
| Fy | + | − | o | o | − | + | − | − | − | − | − | − | − | + | o | o | + | − | + | + | + | + | + | + |
| Fz | − | + | − | + | − | + | − | + | + | − | − | + | − | + | − | + | − | + | + | − | + | + | − | + |
| Mx | o | o | o | o | o | o | − | + | + | − | − | + | o | + | o | o | o | o | + | − | + | − | + | − |
| My | + | − | + | − | + | − | o | o | o | o | o | o | − | + | − | + | − | + | o | o | o | o | o | o |
| Mz | − | + | o | + | + | − | − | + | o | o | + | − | − | + | o | o | + | − | − | + | o | o | + | − |

F I G. 8a
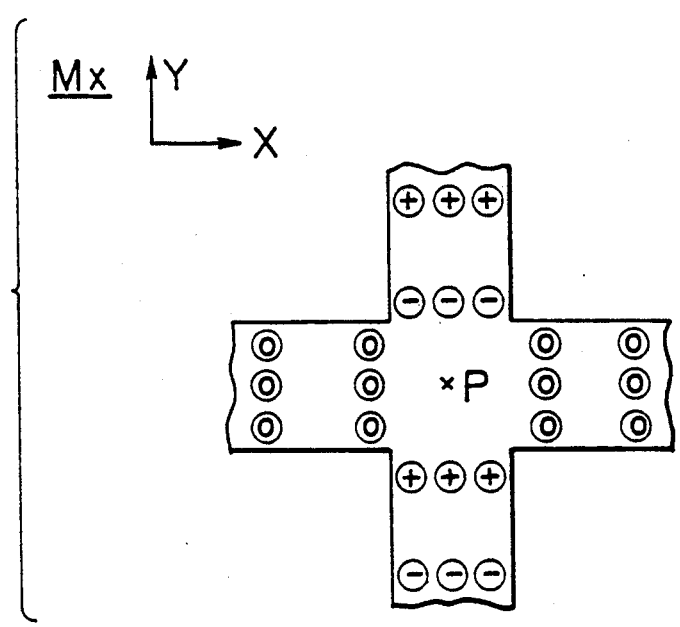
F I G. 8b
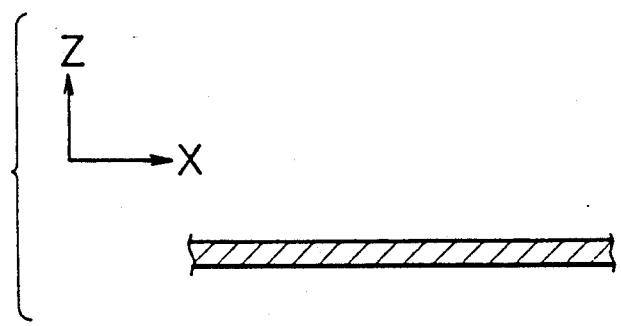
F I G. 8c
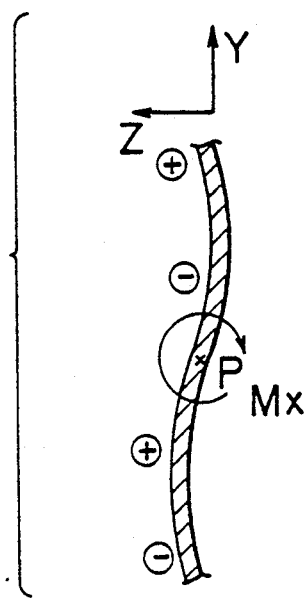

FIG. 10

|     | VFx | VFy | VFz | VMx | VMy | VMz |
|-----|-----|-----|-----|-----|-----|-----|
| Fx  | V   | O   | O   | O   | O   | O   |
| Fy  | O   | V   | O   | O   | O   | O   |
| Fz  | O   | O   | V   | O   | O   | O   |
| Mx  | O   | O   | O   | V   | O   | O   |
| My  | O   | O   | O   | O   | V   | O   |
| Mz  | O   | O   | O   | O   | O   | V   |

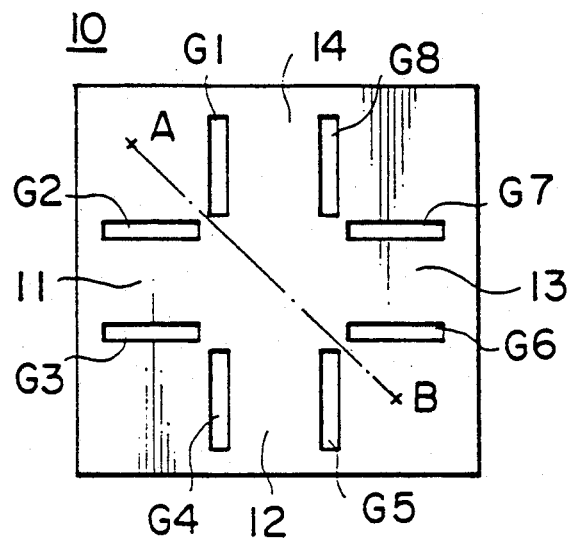
F I G. 16a
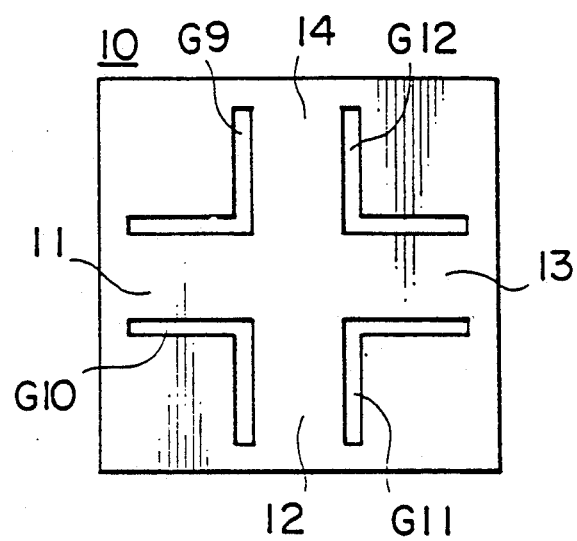
F I G. 16b
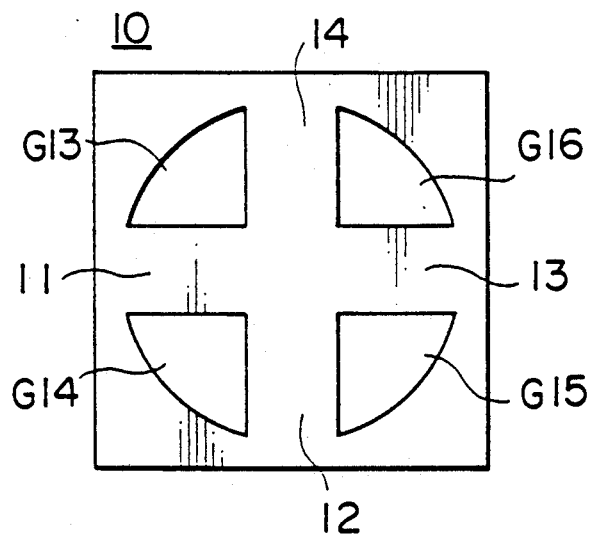
F I G. 16c
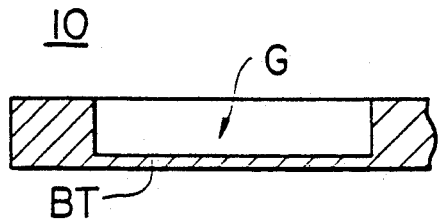
F I G. 17a
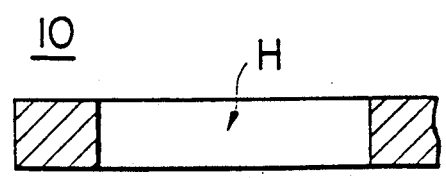
F I G. 17b

FORCE DETECTOR USING RESISTANCE ELEMENTS

BACKGROUND OF THE INVENTION

This invention relates to a force detector, and more particularly to a force detector for detecting forces applied or exerted in respective axial directions and moments applied or exerted about respective axes in an XYZ three-dimensional coordinate system wherein the origin is used as a working point.

Generally, devices for detecting a force exerted on a working point are constructed to detect a stress-strain produced by the application of this force to thereby indirectly make a force detection. The detection of a stress strain is carried out by providing sensors such as strain gauges at respective portions of a strain generative body which produces a strain-stress by the application of a force, and measuring changes in resistance values, etc. of these detectors.

Recently, there has been proposed a technique to arrange, on a semiconductor substrate, resistance elements having the property of the piezo resistance effect that an electric resistance varies by mechanical deformation to detect a force from changes in the resistance values of these resistance elements. This technique intends to cause a mechanical deformation on the semiconductor substrate by the application of force, thus to electrically detect changes in the resistance values of the resistance elements produced by such a mechanical deformation. For example, there is disclosed, in the International Application based on the Patent Cooperation Treaty No. PCT/JP88/394, a technique to form a plurality of resistance elements at predetermined positions along the X-axis and Y-axis directions on a substrate extending on the XY-plane and assemble these resistance elements into a peculiar bridge circuit, thereby making it possible to detect forces applied or exerted in respective axial directions and moments exerted about respective axes as changes in the bridge voltage.

However, the force detector disclosed in the above-described International Application has the following problems.

(1) In order to allow a mechanical deformation to be easily produced on a substrate on the basis of an applied force, several portions of the substrate are hollowed out to form a first bridge portion along the X-axis direction and a second bridge portion along the Y-axis direction. Where an attempt is made to bond this substrate to a strain generative body comprised of metal, etc., an approach is employed to mount a bonding agent or adhesive on the surface of the stain generative body to melt this bonding agent under the condition of a high temperature to mount the substrate thereon and make a bonding between the strain generative body and the substrate. However, since the substrate includes hollowed out portions therein, the molten bonding agent permeates through the hollowed portions to appear on the substrate surface. The bonding agent which has appeared on the substrate surface in this way exerts a bad influence on various wiring implemented on the substrate surface. This is not favorable.

(2) Fluctuation in the bridge portion is apt to occur. As a result, there are instances where correct measured values cannot be obtained.

(3) Detection of six components of forces in three axial directions of XYZ and moments about three axes thereof can be made, but there are instances where any other component may interfere with a measured value of a component subject to measurement, failing to obtain a correct measured value.

(4) At the time of detecting forces or moments of six components, there occurs a considerable difference between the detection sensitivities of respective components. In actual terms, the detection sensitivity of Fx or Fy becomes equal to about one tenth of the detection sensitivity of Fz. Namely, there is a decuple difference between the detection voltage value when a force is applied in the Z-axis and that when the same force as above is applied in the X-axis or Y-axis. For this reason, it is difficult to precisely process respective output signals.

SUMMARY OF THE INVENTION

In view of the above, an object of this invention is to provide a force detector capable of solving the above-described problems. This object can be attained by the force detector which will be described below.

(1) The first invention according to this application is directed to a force detector for detecting forces in respective axial directions or moments about respective axes using the origin as a working point in an XYZ three-dimensional coordinate system, wherein there is provided a substrate having an upper surface included on an XY plane and comprising, on the side of the upper surface, a first region along the positive direction of an X-axis, a second region along the negative direction of the X-axis, a third region along the positive direction of a Y-axis, and a fourth region along the negative direction of the Y-axis, wherein grooves having a depth which does not reach the lower surface of the substrate are formed at boundary portions of the above-described respective regions on the side of the upper surface of the substrate, whereby when a force is exerted on the origin, strains produced on the upper surface of the substrate are caused to have features peculiar to the respective four regions, and wherein resistance elements having a property such that an electric resistance varies due to a mechanical deformation are formed in the four regions, respectively, thus to detect forces exerted on the origin or moments exerted about the axes on the basis of changes in the electric resistance values of these resistance elements.

In accordance with this force detector, grooves having a depth which does not reach the lower surface of the substrate are formed on the upper side of the substrate. When a force is exerted on the origin, strains produced in respective regions have features peculiar to respective regions by the action of these grooves. Namely, the bridge portions in the prior art can be formed without hollowing through the substrate. Accordingly, there is no possibility that a molten bonding agent or adhesive on the strain generative body permeates up to the substrate surface. Thus, the above-described problem (1) can be solved.

(2) The second invention according to this application is directed to a force detector for detecting a force exerted in an X-axis direction using the origin as a working point in an XYZ three-dimensional coordinate system, wherein there are provided bridge portions formed along a Y-axis on the both sides of the origin, respectively, wherein the both ends of each bridge portion are fixed as a fixed portion so that a strain is produced in each bridge portion by applying a force in the X-axis direction to the origin, wherein resistance element groups each comprised of a plurality of resistance elements having a property such that an electric resistance varies due to a mechanical deformation are provided, on the XY plane of the bridge portions, a pair of groups being located oppositely to each other along a positive side of the Y-axis on the area near to the origin, a pair of groups being located oppositely to each other along a negative side of the Y-axis on the area near to the origin, a pair of groups being located oppositely to each other along the positive side of the Y-axis on the area near to the fixed portion, and a pair of groups being located oppositely to each other along the negative side of the Y-axis on the area near to the fixed portion, wherein a resistance element of the resistance element group existing on the area near to the origin of the first quadrant and a resistance element of the resistance element group existing on the area near to the fixed portion of the second quadrant are connected in series to constitute a first side, wherein a resistance element of the resistance element group existing on the area near to the origin of the fourth quadrant and a resistance element of the resistance element group existing on the area near to the fixed portion of the third quadrant are connected in series to constitute a second side, wherein a resistance element of the resistance element group existing on the area near to the origin of the second quadrant and a resistance element of the resistance element group existing on the area near to the fixed portion of the first quadrant are connected in series to constitute a third side, wherein a resistance element of the resistance element group existing on the area near to the origin of the third quadrant and a resistance element of the resistance element group existing on the area near to the fixed portion of the fourth quadrant are connected in series to constitute a fourth side, and wherein a bridge circuit is formed so that the first and second sides are opposite to each other, and that the third and fourth sides are opposite to each other with respect to these four sides, thus to detect a force exerted in the X-axis direction by a bridge voltage of the bridge circuit.

In this force detector, two bridge portions are provided along the Y-axis, thus to detect a force exerted in the X-axis direction by the resistance elements formed around the Y-axis. Since the force in the X-direction is perpendicular to the length direction of the bridge portion, strains produced in the bridge portions become free from fluctuation and stable. Accordingly, correct measured values free from fluctuation can be provided. Thus, the above-described problem (2) can be solved.

(3) The third invention according to this application is directed to a force detector for detecting a force exerted in a Z-axis direction using the origin as a working point in an XYZ three-dimensional coordinate system, wherein there are provided bridge portions formed along an X-axis on the both sides of the origin, respectively, wherein the both ends of each bridge portion are fixed as a fixed portion so that a strain is produced in each bridge portion by applying a force in the Z-axis direction to the origin, wherein resistance element groups each comprised of a plurality of resistance elements having a property such that an electric resistance varies due to a mechanical deformation are provided, on the XY plane of the bridge portions, a first group being located on the side of the origin in the positive direction of an X-axis, a second group being located on the side of the origin in the negative direction of the X-axis, a third group being located on the side of the fixed portion in the positive direction of the X-axis, and a fourth group being located on the side of the fixed portion in the negative direction of the X-axis, wherein one resistance element of the first resistance element group and one resistance element of the second resistance element group are connected in series to constitute a first side, wherein another resistance element of the first resistance element group and another resistance element of the second resistance element group are connected in series to constitute a second side, wherein one resistance element of the third resistance element group and one resistance element of the fourth resistance element group are connected in series to constitute a third side, wherein another resistance element of the third resistance element group and another resistance element of the fourth resistance element group are connected in series to constitute a fourth side, and wherein a bridge circuit is formed so that the first and second sides are opposite to each other, and that the third and fourth sides are opposite to each other with respect to these four sides, thus to detect a force exerted in the Z-axis direction by a bridge voltage of the bridge circuit.

In this force detector, forces in the axial directions and moments about the axes are detected by resistance elements arranged substantially on the axis. By employing an arrangement including resistance elements substantially on the axis, influence of forces in other axial directions and moments about those axes is suppressed. As a result, correct measured values which do not undergo interference by other components are provided. Thus, the above-described problem (3) can be solved.

(4) The fourth invention according to this application is directed to a force detector for detecting a moment about an X-axis using the origin as a working point in an XYZ three-dimensional coordinate system wherein there are provided bridge portions formed along a Y-axis on the both sides of the origin, respectively, wherein the both ends of each bridge portion are fixed as a fixed portion so that a strain is produced in each bridge portion by applying a moment about the X-axis to the origin, wherein resistance element groups each comprised of a plurality of resistance elements having a property such that an electric resistance varies due to a mechanical deformation are provided, a first group being located on the side of the origin in the positive direction of the Y-axis, a second group being located on the side of the origin in the negative direction of the Y-axis, a third group being located on the side of the fixed portion in the positive direction of the Y-axis, and a fourth group being located on the side of the fixed portion in the negative direction of the Y-axis, wherein one resistance element of the first resistance element group and one resistance element of the fourth resistance element group are connected in series to constitute a first side, wherein another resistance element of the first resistance element group and another resistance element of the fourth resistance element group are connected in series to constitute a second side, wherein one resistance element of the second resistance element group and one resistance element of the third resistance element group are connected in series to constitute a third side, wherein another resistance element of the second resistance element group and another resistance element of the third resistance element group are connected in series to constitute a fourth side, and wherein a bridge circuit is formed so that the first and second sides are opposite to each other, and that the third and fourth sides are opposite to each other with respect to these four sides, thus to detect a moment exerted about the X-axis by a bridge voltage of the bridge circuit.

Since resistance elements are arranged substantially on the axis also in this force detector, correct measured values which do not undergo interference of other components can be provided. Thus, the above-described problem (3) can be solved.

(5) The fifth invention according to this application is directed to a force detector comprising a resistance element having a property such that an electric resistance varies due to a mechanical deformation and formed on a predetermined plane, and a strain generative body for allowing the resistance element to produce a mechanical deformation, wherein when the origin is taken on the above-described plane to define an XYZ three-dimensional coordinate system so that the plane is included in the XY plane of the coordinate system, the force detector is operative to detect a force exerted in a coordinate axis direction or a moment exerted about the coordinate axis using the origin as a working point, the strain generative body comprising:

a working portion positioned below the origin and transmitting an applied force to the origin, a fixed portion for fixing the periphery of the plane on which the resistance element is formed, a first flexible portion formed between the working portion and the fixed portion and having a sufficient flexibility with respect to a Z-axis direction, and a second flexible portion formed between the working portion and the fixed portion and having a sufficient flexibility with respect to a direction perpendicular to the Z-axis.

In this force detector, the first and second flexible portions are formed in the strain generative body. Since the first flexible portion has a sufficient flexibility with respect to the Z-axis direction, when a force in the Z-axis direction is applied to the working portion, a mechanical deformation in the Z-axis direction is sufficiently transmitted to the resistance element by bending of the first flexible portion. Further, since the second flexible portion has a sufficient flexibility with respect to the direction perpendicular to the Z-axis, when a force in the X-axis or Y-axis direction is applied to the working portion, a mechanical deformation in the X-axis or Y-axis direction is sufficiently transmitted to the resistance element by bending of the second flexible portion. Eventually, substantially uniform detection sensitivities can be provided with respect to any one of components in X-axis, Y-axis and Z-axis directions. Thus, the above-described problem (4) can be solved.

(6) The sixth invention according to this application is directed to a force detector comprising:

a substrate including a resistance element formed on an upper surface thereof, the resistance element having a property such that an electric resistance varies due to a mechanical deformation, and a strain generative body connected to a lower surface of the substrate in order to produce a mechanical deformation in the substrate, wherein when the origin is taken on the upper surface of the substrate to define an XYZ three-dimensional coordinate system so that the upper surface of the substrate is included in the XY plane, the force detector is operative to detect a force exerted in a coordinate axis direction or a moment exerted about a coordinate axis using the origin as a working point, the strain generative body comprising:

a working portion connected at a position below the origin of the substrate and transmitting an applied force to the origin, a fixed portion for fixing the periphery of the substrate, a first flexible portion formed between the working portion and the fixed portion and having a sufficient flexibility with respect to a Z-axis direction, and a second flexible portion formed between the working portion and the fixed portion and having a sufficient flexibility with respect to a direction perpendicular to the Z-axis.

Also in this force detector, substantially uniform detection sensitivities are provided with respect to the components of respective directions. Thus, the above-described problem (4) can be solved.

(7) The seventh invention according to this application is directed to a force detector wherein, in the above-described force detector according to the fifth invention, the first flexible portion is constituted by an annular flat plate portion provided so as to surround the periphery of the Z-axis, the annular flat plate portion extending along a plane substantially perpendicular to the Z-axis and having a small thickness in the Z-axis direction.

(8) The eighth invention according to this application is directed to a force detector wherein, in the above-described force detector according to the fifth invention, the second flexible portion is constituted by a tubular portion provided so as to surround the periphery of the Z-axis, the tubular portion extending along the Z-axis and having a small thickness in a direction perpendicular to the Z-axis.

(9) The ninth invention according to this application is directed to a force detector wherein, in the above-described force detector according to the fifth invention, holes are formed through the strain generative body so as to form bridge portions with a part between the holes.

(10) The tenth invention according to this application is directed to a manufacturing method for a force detector comprising a substrate and a strain generative body, the substrate comprising bridge portions on an upper surface of which resistance elements are formed, the resistance elements having a property such that an electric resistance varies due to a mechanical deformation, the strain generative body being connected to a lower surface of the substrate in order to produce a mechanical deformation in the bridge portions, the method comprising the steps of:
preparing a substrate including a resistance elements and grooves formed on an upper surface thereof,
preparing a strain generative body on an upper surface of which the substrate is to be bonded,
bonding the substrate on the strain generative body using bonding agent, and
removing a part of said substrate which locates under the grooves so that holes through the substrate are formed and bridge portions are formed between the holes after the bonding agent becomes hardened.

BRIEF DESCRIPTION OF THE DRAWINGS

FIGS. 8a to 8c are diagrams showing the state where a moment about the X-axis is applied to the substrate shown in FIG. 1, FIGS. 9a to 9c are diagrams showing the state where a moment about the Z-axis is applied to the substrate shown in FIG. 1, FIG. 10 is a Table showing the relationship between a force or a moment to be detected and a voltage detected in the substrate shown in FIG. 1, FIG. 16a is a diagram showing arrangement of grooves in the substrate shown in FIG. 1, and FIG. 16b and 16c are diagrams showing substrates having different arrangements, respectively, FIG. 17a is a cross sectional view of a substrate including grooves formed therein, and FIG. 17b is a cross sectional view of a substrate including through holes formed therein.

DESCRIPTION OF THE PREFERRED EMBODIMENTS

This invention will now be described in accordance with the preferred embodiments shown.

§1 Configuration of the detector

Figure 1A:
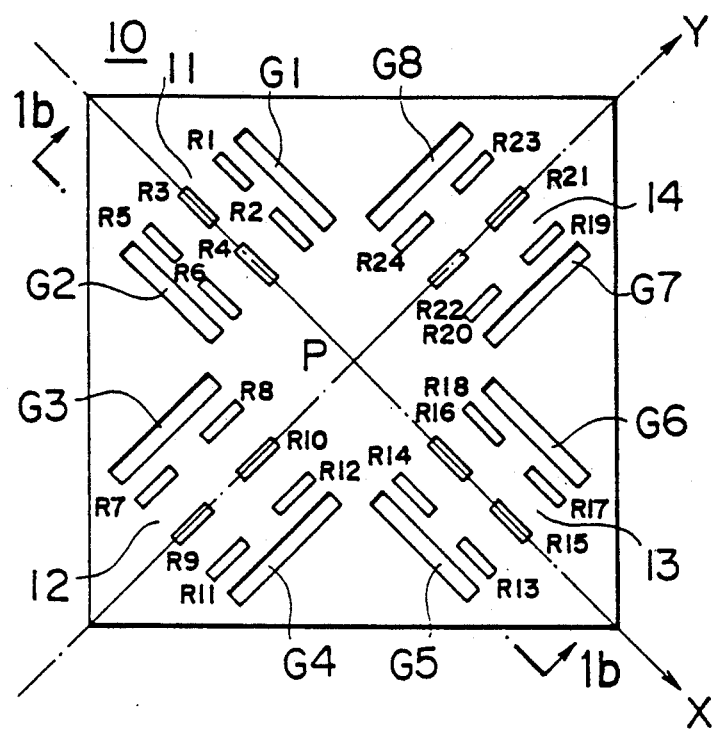
FIG. 1a is a top view of a substrate used in a force detector according to an embodiment of this invention.
Figure 1B:
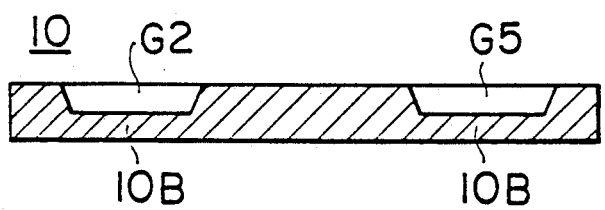
FIG. 1b is a cross sectional view cut along the cutting line 1b—1b of the substrate, and FIG. a cross sectional view of a further improved substrate.
Figure 1C:
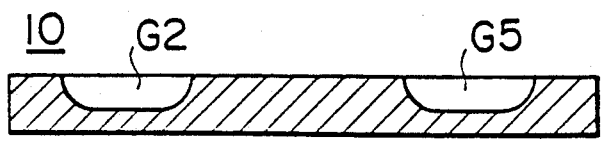

FIG. 1a is a top view of a force detector according to an embodiment of this invention, and FIG. 1b is a cross sectional view cut along the cutting line 1b-1b of the detector. In this embodiment, twenty four sets of resistance element groups R1 to R24 are formed on the surface of a substrate 10. The substrate 10 is comprised of a single crystal substrate of silicon and eight grooves G1 to G8 are formed on the side of the upper surface thereof. These grooves G1 to G8 do not reach the lower surface thereof. In other words, these grooves are characterized in that they are not constructed as a through hole longitudinally penetrating through the substrate 10. This appearance can be readily understood when an attention is drawn to the cross sectional view of FIG. 1b. Such grooves can be readily formed by applying the etching processing to the substrate 10. When an anisotropic etching is implemented, a groove having a cross section formed as shown in FIG. 1b can be formed. Further, when an isotropic etching is implemented, a groove having a cross section formed as shown in FIG. 1c can be formed. By forming such grooves, the upper surface of the substrate 10 is partitioned into four regions of the regions 11 to 14. When a force is applied to the working point P in the center of the substrate, mechanical distortions in all regions are produced. When the grooves G1 to G8 are hollowed out so as to reach the lower surface of the substrate, bridges are formed in the regions 11 to 14, respectively. However, even in the case of grooves which do not reach the lower surface as in this embodiment, the regions 11 to 14 play a role equivalent to the bridge with respect to the phenomenon relating to the mechanical distortion produced on the upper surface of the substrate 10, as far as a thickness of a bottom part under the grooves is relatively thin compared with that of the substrate. It will be described that regions 11 to 14 are called bridge portions 11 to 14, as shown, in a model form, in FIG, 2, respectively. Further, the XYZ three-dimensional coordinate system is defined as shown using the working point P determined in the center of the upper surface of the substrate 10 as the origin. Z-axis is the axis directed from the origin P toward the upward direction with respect to the plane of paper.

Figure 2:
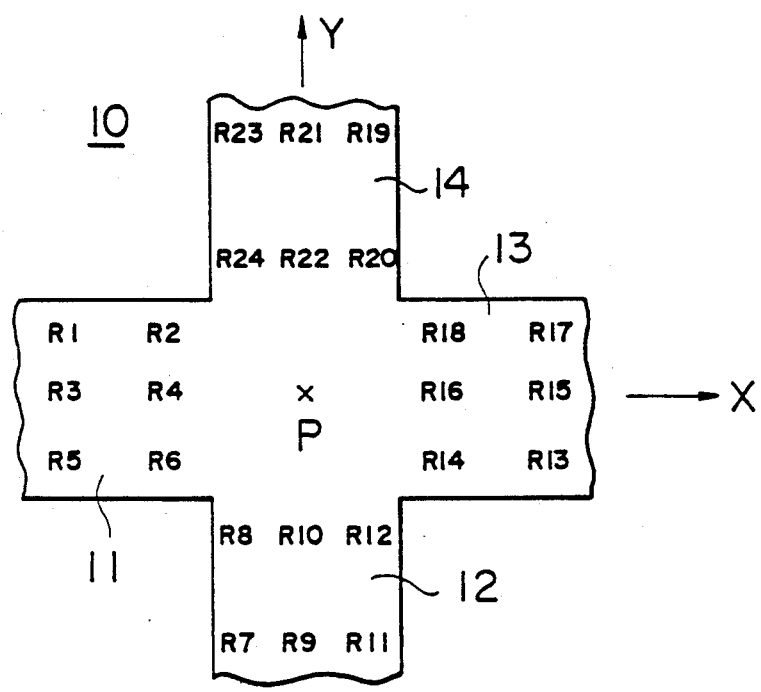
FIG. 2 is a model view showing an arrangement of resistance element groups on the substrate shown in FIG. 1.
Figure 3:
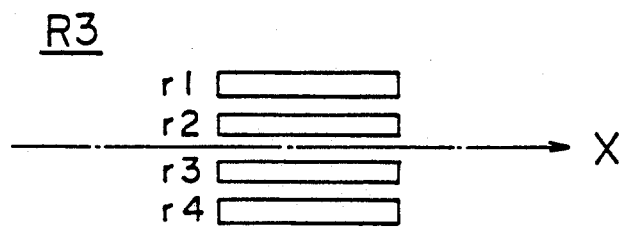
FIG. 3 is a view showing a plurality of resistance elements constituting one resistance element group of the substrate shown in FIG. 1a, FIGS. 4a to 4f to are diagrams showing bridge circuits including resistance elements combined of the substrate shown in FIG. 1, respectively.

Each of resistance element groups R1 to R24 is comprised of a plurality of resistance elements. The positions of respective resistance element groups shown in FIG. 1a only show the regions where resistance elements belonging to corresponding resistance element groups are distributed. For example, the resistance element group R3 is composed of four resistance elements r1 to r4 as shown in FIG. 3, and these resistance elements r1 to r4 are distributed in the region labeled R3 in FIG. 1a. It is to be noted that it is preferable for providing a high sensitivity to arrange respective resistance elements so that the length direction thereof is in correspondence with the length direction of the resistance element groups R1 to R24 shown in FIG. 1a. The arrangement of these resistance element groups is characterized in that respective groups R3, R4, R15 and R16 are arranged substantially on the X-axis, that respective groups R9, R10, R21 and R22 are arranged substantially on the Y-axis, and that the remaining groups are arranged along the both sides of the X-axis or the Y-axis with a small distance from the axis close to edges of the bridges. Such a symmetric arrangement is shown in FIG. 2 in a model form. Respective resistance elements are formed by diffusing an impurity on a single crystal substrate. The resistance elements formed in this way exhibit the piezo resistance effect and have therefore a property such that an electric resistance varies due to a mechanical deformation.

The periphery of the substrate 10 is fixed to serve as a fixed portion with respect to the working point P. It is now assumed that resistance element groups attached by even reference numerals and resistance element groups attached by odd reference numerals are called resistance element groups on the side of the origin and resistance element groups on the side of the fixed portion, respectively. In the arrangement where the periphery of the substrate 10 is fixed as the fixed portion as stated above, when a force is applied to the working point P, various strains-stresses are produced in the bridge portions 11 to 14. By such strains, changes in the electric resistance values of resistance elements of respective resistance element groups are produced. This detector detects a force applied to the working point P on the basis of changes in the electric resistance. It is to be noted that any strain generative body is bonded to the working point P in an actual term and a force is applied to the working point P through the strain generative body.

By using twenty four sets of resistance element groups arranged as described above, six kinds of bridges as shown in FIGS. 4a to 4f are formed. Power supplies 30 are connected to the respective bridges. Further, voltage meters 41 to 46 for outputting voltages VFx, VFy, VFz, VMx, VMy, and VMz proportional to Fx, Fy, Fz, Mx, My and Mz as bridge voltages are connected to respective bridges.

It is now assumed that the symbol of each resistance element shown in these bridge circuit diagrams means one resistance element in a corresponding resistance element group, and even in the case of resistance elements to which the same symbol is attached, they mean different resistance elements belonging to the same resistance element group. For example, in the circuit diagram of FIGS. 4a–4f, resistance elements labeled R3 are used at two portions in FIG. 4c and at two portions in FIG. 4e, i.e., at four portions in total. These resistance elements use four resistance elements r1 to r4 shown in FIG. 3, respectively, and are electrically independent different resistance elements. In this example, for brevity of explanation, the same symbol Rx is used in order to indicate one resistance element belonging to the resistance element group Rx (x=1 to 24).

§2 Operation of the detector

Figure 6A:
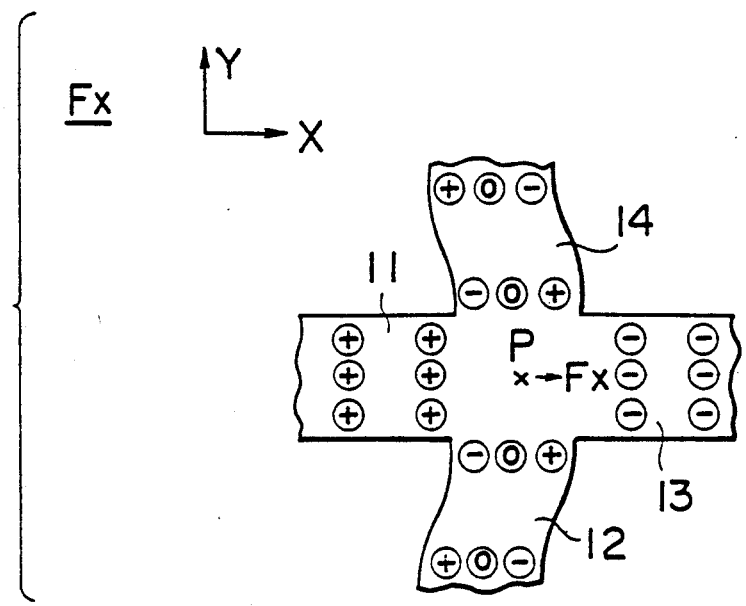
Figure 6B:
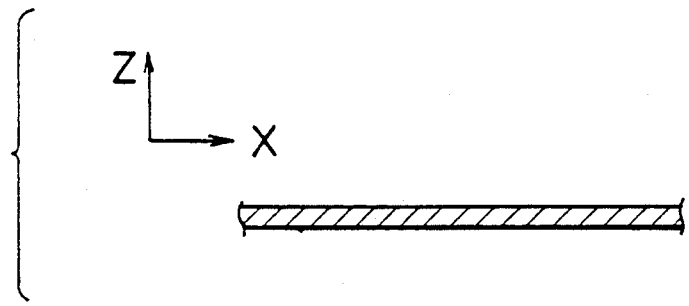
Figure 6C:
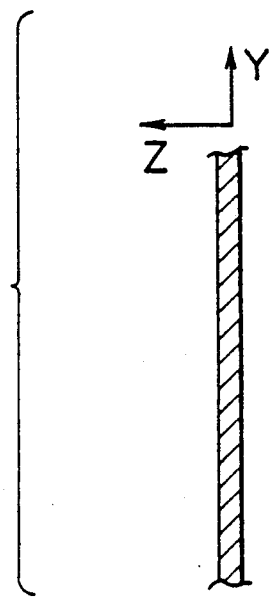
Figure 7A:
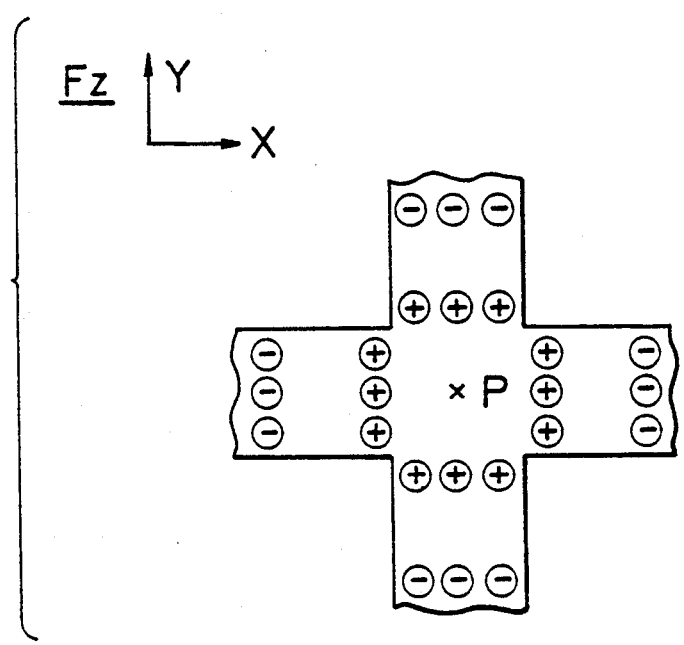
FIGS. 7a to 7c to are diagrams showing the state where a force in the Z-axis direction is applied to the substrate shown in FIG. 1.
Figure 7B:
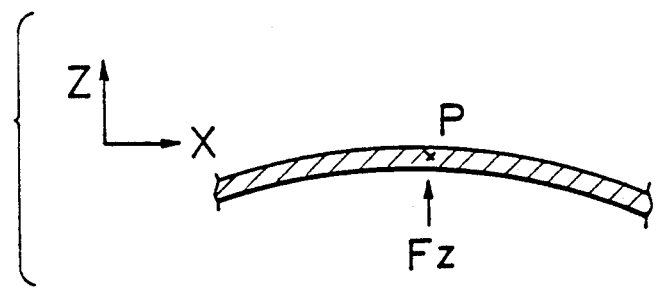
Figure 7C:
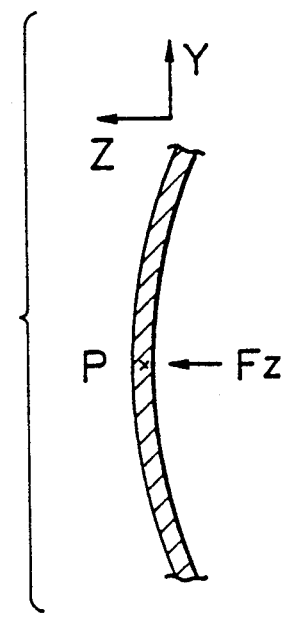

The operation of the above-described detector will now be described. Where resistance elements are arranged as shown in FIG. 1, when forces Fx, Fy, Fz or moments Mx, My, Mz are applied to the working point P, respective resistance elements R1 to R24 produce electric resistance changes as indicated by the Table shown in FIG. 5 (each resistance element is assumed to be comprised of a P-type semiconductor). In this Table, "0" indicates no change, "+" indicates an increase in the electric resistance, and "−" indicates a decrease in the electric resistance. The reason why the result as shown in FIG. 5 is obtained will now be briefly described with reference to FIGS. 6's to 9's. FIGS. 6's to 9's are views showing the stress-strain produced in the bridge portion and changes in the electric resistance when forces Fx, Fy, Fz or moments Mx, My, Mz are applied to the working point P, wherein FIGS. 6a to 9a are top views of the bridge portion, FIGS. 6b to 9b are front cross sectional views thereof, and FIGS. 6c to 9c are side cross sectional views, respectively. For example, the state where a force in the X-axis direction is applied to the working point P is shown in FIGS. 6a to 6c. By the force Fx, the bridge portion 11 is expanded and the bridge portion 13 is contracted. Accordingly, resistance elements (R1 to R6) at the bridge portion 11 are expanded, resulting in an increased electric resistance (in the case of the P-type semiconductor), and resistance elements (R13 to R18) at the bridge portion 13 are contracted, resulting in a decreased electric resistance. Resistance elements at the bridge portion 12 and 14 are expanded or contracted depending upon the arrangement positions. It will be readily understood that the result as shown in the first row of the Table in FIG. 5 is eventually obtained. Attention is now drawn to the case where the force Fy is applied. This case corresponds to the case where the X-axis and the Y-axis are simply exchanged. Accordingly, the result as shown in the second row of the Table in FIG. 5 is provided. Further, where a force Fz is applied, the state shown in FIG. 7 results. Accordingly, the result as shown in the third row of the Table is provided. On the other hand, where a moment is applied, the operation is as follows. Initially, where a moment Mx about the X-axis is applied, the state shown in FIGS. 8a to 8c results. Accordingly, the result as shown in the fourth row of the Table is provided. Attention is now drawn to the case where a moment My about the Y-axis is applied. This case corresponds to the case where the X-axis and the Y-axis are simply exchanged in FIGS. 8a to 8c. Accordingly, the result as shown in the fifth row of the Table is provided. Finally, where a moment Mz about the Z-axis is applied, the state shown in FIGS. 9a to 9c results. Accordingly, the result as shown in the sixth row of the Table is provided.

When the fact that bridges as shown in FIGS. 4's are constructed by respective resistance elements R1 to R24 is taken into consideration, the relationship between Fx, Fy, Fz, Mz, My, Mz applied to the working point P and voltage detected VFx, VFy, VFz, VMx, VMy, VMz appearing on the voltage meters 41 to 46 is shown by the Table in FIG. 10. In this Table, "0" indicates that no voltage change is produced, and "V" indicates that a voltage change dependent upon an applied force is produced. The polarity of the voltage change is dependent upon the direction of an applied force and the magnitude of the voltage change is dependent upon the magnitude of an applied force.

The reason why the Table as shown in FIG. 10 is provided will be readily understood by taking into consideration the fact that there is no voltage change when the products of the resistance values of the resistance elements constituting the respective opposite sides of the bridge are equal to each other in the circuit diagram of FIGS. 4's. For example, where a force Fx is applied, respective resistance elements produce changes in the electric resistance as shown in the first row of the Table in FIG. 5. Referring now to FIG. 4a, the resistance values of R20, R23, R7, R12 are all increased and the resistance values of R8, R11, R19, R24 are all decreased. Accordingly, there is produced a large difference between the products of the resistance values of the resistance elements constituting the opposite sides. Thus, a voltage change "V" is detected. On the other hand, no change is produced in the bridge circuit shown in FIGS. 4b to 4f. For example, in the circuit of FIG. 4b, R1 and R6 are represented by "+", so each resistance value is increased, while R14 and R17 are represented by "−", so each resistance value is decreased. The same relationship as stated above holds in connection with R2, R5, R13, R18 constituting another opposite side. Eventually, there is no change in the bridge voltage. As stated above, the action of the force Fx exerts influence only on VFx. Thus, the force Fx can be independently detected by the measurement of VFx. It is to be noted that since there is unevenness in the characteristic of each resistance element in actual mass-produced goods, it is difficult to completely exclude the influence of other components. This will be described later in the chapter of "§3 the advantage with this embodiment"

Eventually, the fact that only the orthogonal component is "V" and other components are all "0" in the Table of FIG. 10 implies that respective values detected can be directly provided as a reading value of the voltage meter without performing any computation.

It is to be noted that the influence of the resistance change based on a factor except for stress can be canceled by constituting a bridge as described above. While the electric resistance values of respective resistance elements vary, e.g., in dependency upon temperature, all resistance elements constituting the bridge vary substantially in the same manner, so the influences of the above temperature changes are canceled. Accordingly, a higher precision measurement can be made by such a bridge construction.

§3 Advantages with this embodiment

Figure 11:
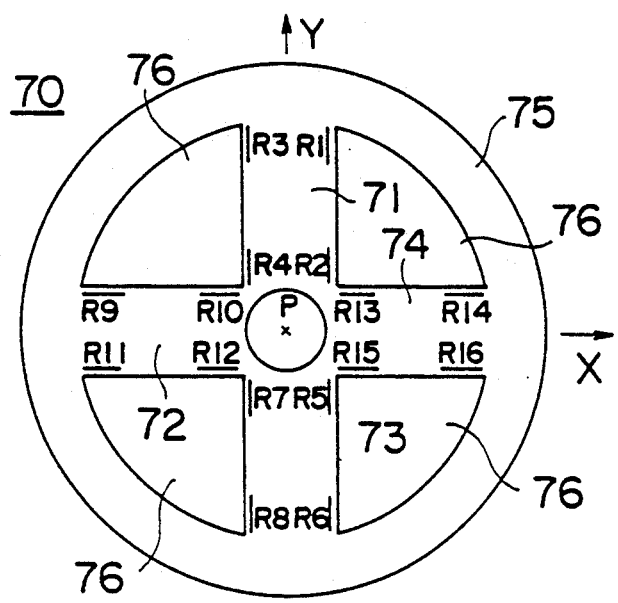
FIG. 11 is a top view of a substrate used in a conventional force detector.
Figure 12:
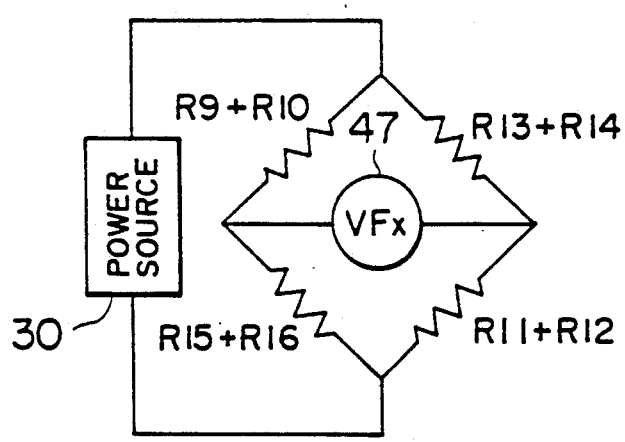
FIG. 12 is a diagram showing one of bridge circuits comprised of resistance elements combined of the conventional substrate shown in FIG. 11.

The advantages with the above-described embodiment will now be described in comparison with the conventional detector. The outline of a conventional detector disclosed in the International Application based on the Patent Cooperation Treaty No. PCT/JP88/394 will be first described for reference. FIG. 11 is a top view of this conventional detector and FIG. 12 is a bridge circuit diagram for detecting a force Fx in the X-axis direction in this detector. As shown in FIG. 11, this detector includes cross-shaped bridge portions 71 to 74, and a fixed portion 75 formed circumferentially on the outside thereof. In the bridge portions, resistance element groups R1 to R16 are formed. Between adjacent bridge portions, quadrant hollowed out portions 76 are provided. Each hollowed out portion 76 is a through hole penetrating from the upper surface to the lower surface. To speak conversely, the provision of these hollowed out portions 76 results in formation of four bridge portions 71 to 74. Six kinds of bridge circuits are constructed by combining resistance elements belonging to the resistance element groups R1 to R16. Thus, forces or moments of six components of Fx, Fy, Fz, Mz, My, Mz can be detected. A bridge circuit for detecting Fx among them is shown in FIG. 12. When a voltage is delivered from the power supply 30, the force Fx can be detected by the voltage meter 47. The above-mentioned International Application should be referenced in connection with the detail.

As mentioned in "BACKGROUND OF THE INVENTION", the three problems exist in this conventional detector. The detector of this embodiment can solve these problems. Respective problems will be described in succession.

Figure 13:
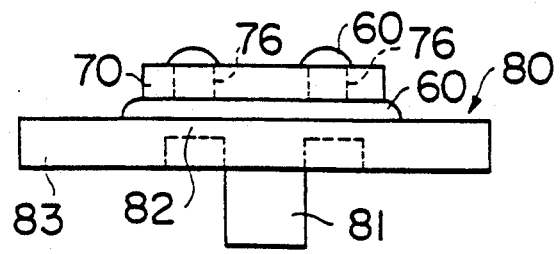
FIG. 13 is a diagram showing the state where the conventional substrate shown in FIG. 11 is bonded to a strain generative body.

(1) The first problem of the conventional detector is that, in the case of bonding the substrate to the strain generative body, the bonding agent permeates through the hollowed out portions of the substrate to reach the substrate surface, exerting a bad influence on the wiring. This appearance is shown in FIG. 13 which shows the state where the substrate 70 of the conventional detector is bonded to the strain generative body 80. The strain generative body 80 is comprised of metal and is constructed as a member circular when viewed from the upper surface. A working portion 81 positioned in the center thereof is projected downwardly, and a flexible portion 82 to which flexibility is given because the thickness is thin is formed around the strain generative body 80. Further, a fixed portion 83 is formed along the outer periphery thereof. The substrate 70 is bonded through a bonding agent layer 60 on the upper surface of the strain generative body 80. When a force is applied to the working portion 81 under the state where the fixed portion 83 is fixed, the flexible portion 82 is bent. As a result, a mechanical deformation is produced in the strain generative body 80. The strain thus produced is transmitted to the substrate or base plate 70. In this way, a force applied to the working portion 81 can be detected as a force applied to the working point P on the substrate 70. Since a semiconductor substrate is ordinarily used as the base plate 70, it is impossible to directly apply a large force thereto. However, when a substrate bonded to the strain generative body 80 as stated above is used, measurement of a large force can be made.

Meanwhile, since hollowed out portions 76 are provided in the substrate 70 of the conventional detector as previously described, molten bonding agent 60 reaches the upper surface of the substrate through the hollowed out portions 76. On the upper surface of the substrate 70, resistance elements are formed and various wiring is implemented. Thus, the bonding agent exerts bad influence on this wiring.

Figure 14:
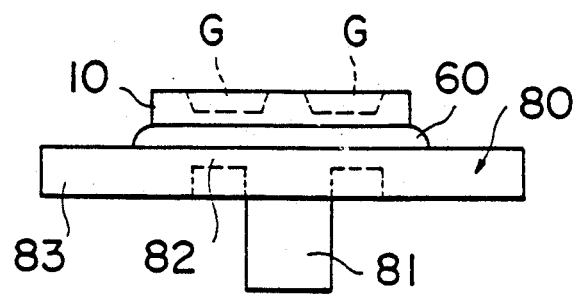
FIG. 14 is a diagram showing the state where the substrate of this invention is bonded to the strain generative body.

On the contrary, in the case of the detector of this embodiment, while grooves G are formed on the side of the upper surface of the substrate 10, these grooves do not reach the lower surface. Accordingly, even in the case where the substrate 10 is bonded to the strain generative body 80 as shown in FIG. 14, there is no disadvantage that the bonding material 60 at the lower surface of the substrate permeates up to the upper surface. This is a great merit in manufacturing mass-produced goods using the strain generative body.

As stated above, a force detector according to this invention is constructed to provide, on the side of the upper surface of the substrate, grooves having a depth which does not reach the lower surface to form bridge portions. Accordingly, there is no possibility that the bonding agent permeates up to the upper surface of the substrate in the case of bonding the substrate, so bad influence is not exerted on the wiring. When a bottom part (10B) of the substrate under the grooves G (refer to FIG. 1b) has a large thickness, enough stress strain cannot be obtained on the bridges. In such a case, the bottom part should be removed with a chemical process or a physical way after the substrate is bonded to the strain generative body.

(2) The second problem of the conventional detector is that since fluctuation takes place in the strain produced in the bridge portion, stable measured values cannot be obtained. This phenomenon will be described in more detail by taking an example of detection of a force Fx in the X-axis direction. The state of the substrate when the force FX is applied to the working point P is shown in FIGS. 6a to 6c. As shown in FIG. 6a, the bridge portion 11 is expanded, the bridge portion 13 is contracted, and the bridge portions 12, 14 are twisted or distorted.

The fundamental difference between the conventional detector and the detector according to this embodiment is as follows. The conventional detector is constructed to measure a force Fx utilizing resistance elements existing in the bridge portions 11 and 13 (corresponding to bridge portions 72, 74 in FIG. 11) shown in FIG. 6a (see the bridge of FIG. 12). In contrast, the detector of this embodiment is constructed to measure a force Fx utilizing the resistance elements existing in the bridge portions 12 and 14. As shown in FIG. 6a, resistance elements existing in the bridge portion 11 indicate "+", and resistance elements existing in the bridge portion 13 indicate "−". Accordingly, the conventional detector detects a force Fx by making use of changes in the resistance value.

Figure 15A:
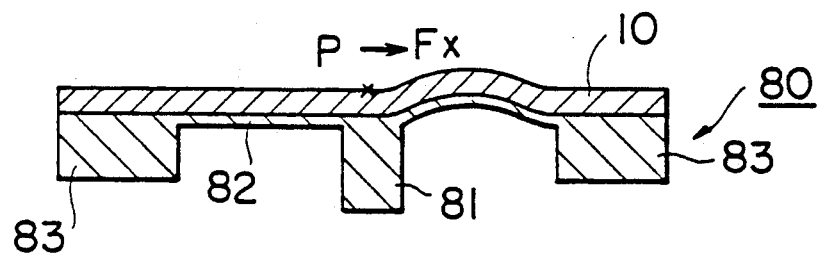
FIGS. 15a and 15b are diagrams for explaining that fluctuation is produced in the strain in the substrate.
Figure 15B:
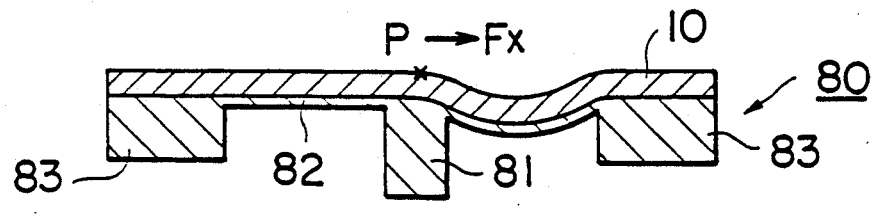

However, in an actual sense, changes in the resistance value of the resistance element existing in the bridge portion 13 considerably become unstable. Namely, the cross section of the substrate when the force Fx is applied is shown in FIG. 6b. This only shows an ideal state, but the cross section is not formed flat in an actual sense. An actual cross section is formed as shown in FIG. 15a or 15b. The portion on the right side of the working point P is contracted, but it is rarely contracted in a flat state. A curvature is produced on the upper side as shown in FIG. 15a, or a curvature is produced on the lower side as shown in FIG. 15b. It is to be noted that the cross section of the substrate 10 is shown with that of the strain generative bodies 80 in FIGS. 15a and 15b in order to clarify the positional relationship of respective portions in an actual detector. Such a curvature produced affects changes in the resistance values of the resistance elements. In addition, curvature is not fixed at all times, but varies in various manners every time, with the result that fluctuation is produced in changes in the resistance value of the resistance element at the bridge portion 13. For this reason, there occurred the problem that stable measured values cannot be obtained with the conventional detector.

On the contrary, the detector of this embodiment utilizes resistance elements existing on the bridge portions 12 and 14 in order to measure the force Fx. When the force Fx is applied, curvature as described above is not produced in these bridge portions 12 and 14, so stable changes in the resistance value can be obtained. Thus, stable measured values can be obtained at all times. In short, the conventional detector utilizes resistance elements distributed along the X-axis in order to measure a force in the X-axis direction. In contrast, the detector of this embodiment utilizes resistance elements distributed along the Y-axis in order to measure a force in the same direction as stated above.

The merit with the detector of this embodiment has been described in connection with measurement of a force Fx in the X-axis direction. The entirely the same merit as above can be obtained also in connection with measurement of a force Fy in the Y-axis direction.

As stated above, a force detector according to this invention is constructed to provide bridge portions along the Y-axis to detect a force applied in the X-axis direction by the resistance elements formed around the Y-axis, thus making it possible to provide non-fluctuated correct measured values.

(3) The third problem of the conventional detector is that any other component interferes with a measurement system of a subject force component, failing to provide correct measured values. In the above-described International Application, it is described that correct measured values free from interference with other components can be provided by suitably combining bridges. Namely, six bridge circuits are assembled in order to detect six components of Fx, Fy, Fz, Mx, My, Mz, respectively. It is also described that when attention is drawn to respective resistance elements constituting one bridge thereamong, e.g., a bridge circuit for detecting Mx, changes in the resistance value are certainly produced also by the action of other forces of five components, but such changes are canceled by the bridge circuits, so only one component of Mx is detected as changes in the bridge voltage. To speak simply, since one side of the bridge indicates a change of "+" with respect to force components which are not subject to measurement while the other side thereof indicates a change of "−" with respect to the same, both changes are canceled with each other. However, it is required for canceling other components by such bridge circuits to satisfy the ideal condition that resistance elements used are caused to be identical in magnitude, shape, and material, thus allowing all the resistance values to be equal to each other and allowing resistance changes rates due to the mechanical deformation to be equal to each other. Namely, since there is employed the principle of canceling forces of other components by changes of "+" and "−", complete cancellation cannot be made unless the value of "+" and the value of "−" are equal to each other. Accordingly, it is very difficult to practically manufacture products which satisfy such a condition. Thus, in the case of mass-producing conventional detectors, they would experience interference of other components.

Figure 4A:
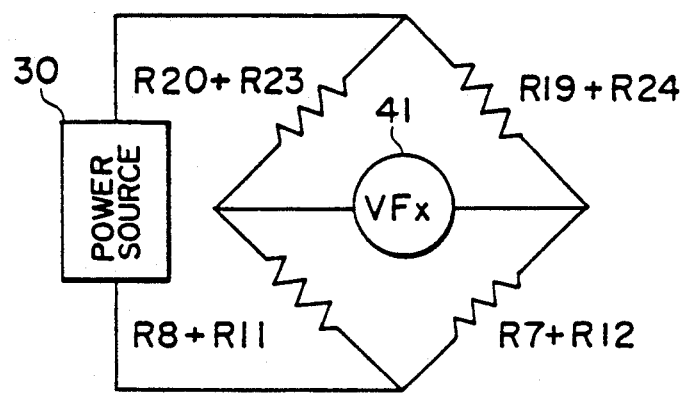
Figure 4B:
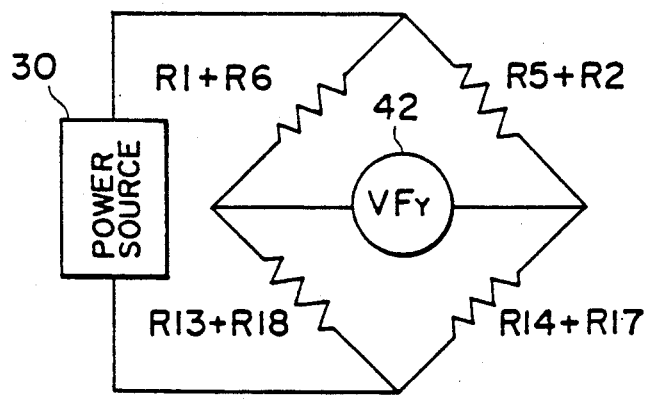
Figure 4C:
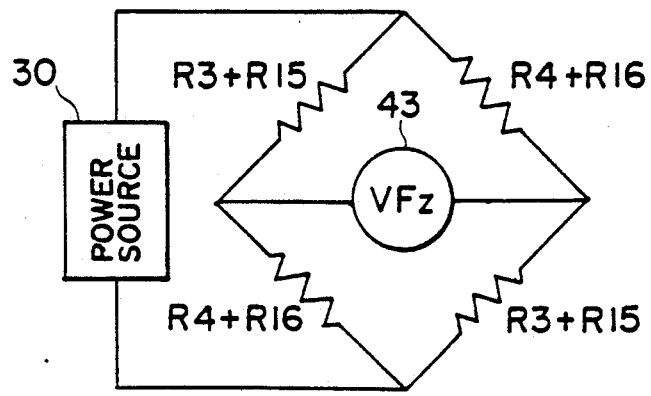
Figure 4D:
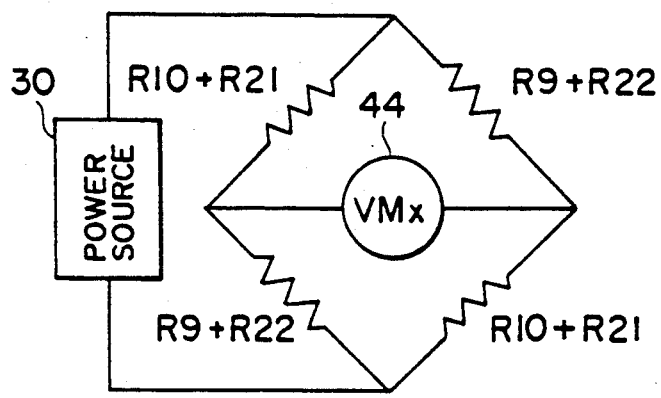
Figure 4E:
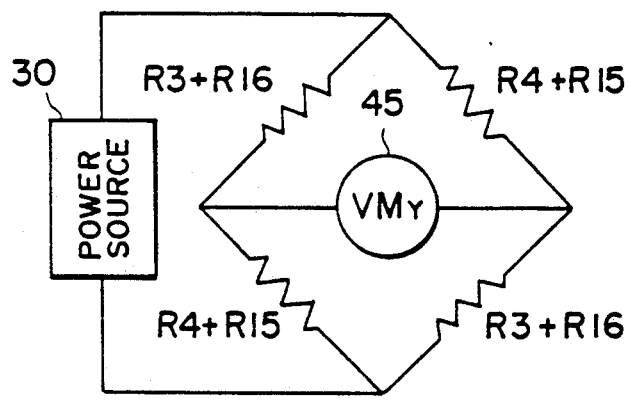
Figure 4F:
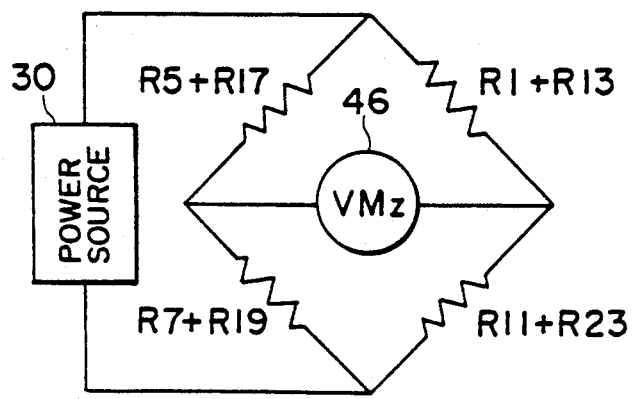
Figure 9A:
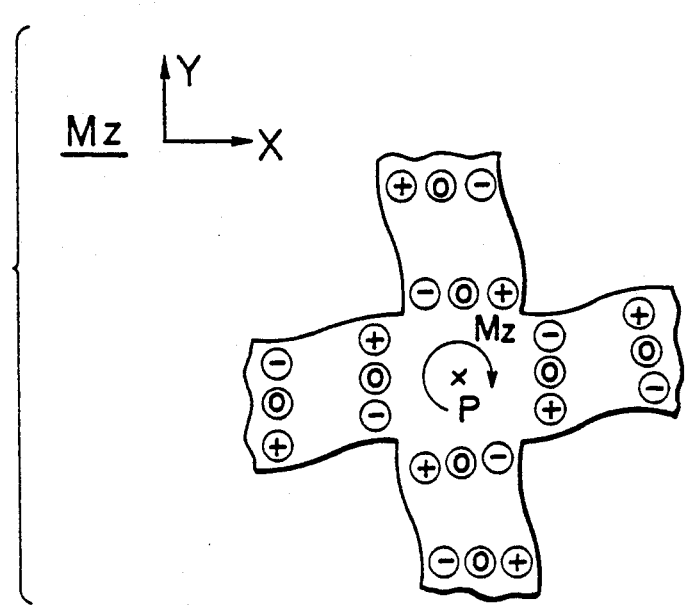
FIG. 9 is a Table showing changes in the resistance of each resistance element of the substrate shown in FIG. 1, FIGS. 6a to 6c are diagrams showing the state where a force in the X axis direction is applied to the substrate shown in FIG. 1.
Figure 9B:
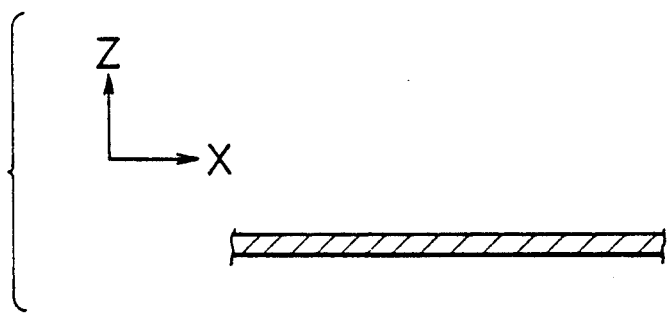
Figure 9C:
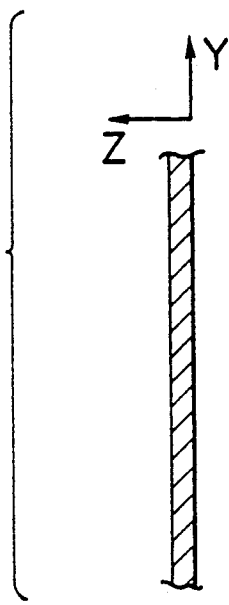

In the detector of this embodiment, there is adopted a technique to construct a bridge circuit using the resistance elements substantially on the axis, thereby to suppress such interference of other components. As seen from the comparison between the arrangement of R1 to R16 shown in FIG. 11 and the arrangement of R1 to R24 shown in FIG. 2, the distinctive difference between the conventional detector and the detector of this embodiment is that resistance element groups R3, R4, R15, R16, R9, R10, R21, R22 are arranged substantially on the axis in the detector of this embodiment. The arrangement resistance elements substantially on the axis as stated above is characterized in that changes in the resistance value when certain force or moment components are applied become "0" at all times. For example, attention is now drawn to the resistance element groups R9, R10, R21, R22 arranged on the Y-axis in FIG. 2. In that case, when a force Fx is applied as shown in FIG. 6a, the change indicates "0" and when a moment Mz is applied as shown in FIG. 9a, the change also indicates "0". In the detector of this embodiment, such resistance element groups on the axis are employed as the bridge circuit for detecting Fz, Mx, My. For example, in the bridge circuit for detecting Mx, as shown in FIG. 4d, resistance element groups R9, R10, R21, R22 arranged on the Y-axis are used. Accordingly, even if forces of other components which are not subject to measurement such as the force Fx or the moment Mz, changes in the resistance values of these resistance element groups represent "0", with the result that no bridge voltage is produced.

As previously described, there is employed in the conventional detector the principle of canceling forces of other components by changes of "−" and "−". However, unless the value of "+" and the value of "−" are equal to each other, complete cancellation cannot be made. On the contrary, since resistance elements of which change originally indicates "0" with respect to specific other components in the detector of this embodiment, even if there is unevenness in the characteristic between resistance elements, such specific forces of other components are not detected. However, since the change does not indicates "0" with respect to all of forces of other components, it is preferable that resistance elements, which are identical to each other in dimension, shape, or material, etc. as far as possible in the same manner as in the prior art, are used as resistance elements used. Thus, the detector of this embodiment can more effectively suppress interference exerted on measured values by forces of other components as compared to the conventional detector.

As stated above, the force detector according to this invention is constructed to detect forces in axial directions or moments about axes by resistance elements arranged substantially on the axis, thereby making it possible to provide correct measured values in which interference of other component is suppressed.

§4 Other embodiments of the substrate

In the substrate 10 shown in FIG. 1, four bridge portions 11 to 14 are formed by digging grooves G1 to G8 at eight portions on the upper surface thereof. FIG. 16a shows only such a groove arrangement. In accordance with the invention of this application, if the requirement that there is used a single crystal substrate including four bridge portions such that predetermined resistance elements can be arranged on respective bridge portions can be essentially satisfied, the advantages with the invention can be provided. Accordingly, grooves digged on the side of the surface of the substrate 10 are not limited to only grooves G1 to G8 shown in FIG. 16a. For example, as shown in FIG. 16b, L-shaped grooves G9 to G12 may be digged at four portions, respectively, or as shown in FIG. 16c, quadrant shaped grooves G13 to G16 may be digged at four portions, respectively. It is to be noted that the groove arrangement shown in FIG. 16a is the most preferable in that wiring on the substrate is efficiently carried out. For example, in the case of implementing a wiring from the point A to the point B in the figure, wiring of the minimum distance can be implemented as indicated by single dotted lines in the figure. Further, in the case of forming grooves by etching, it is difficult to form circular grooves. Accordingly, the embodiment shown in FIG. 16b is more practical than the embodiment shown in FIG. 16c. Especially, grooves having a configuration shown in FIG. 16b can be formed in a substrate having Miller indices (100) of silicon.

While grooves G as shown in FIG. 17a are formed on the substrate 10 all in the above-described embodiments, through holes H as shown in FIG. 17b may be formed. It is to be noted that since the bonding material permeates up to the surface of the substrate in bonding to the strain generative body, it is required to conduct a bonding with the through hole H being blocked by a suitable tool. Accordingly, an embodiment for forming grooves such that the bottom portion BT is left as shown in FIG. 17a is the most preferable. However, where the thickness of the bottom portion BT is thick to some extent, mechanical deformation of the substrate 10 may be impeded under this condition. Accordingly, it is preferable to bond the substrate to the strain generative body thereafter to remove the bottom portion BT by a chemical method such as etching or a mechanical method such as punching.

§5 Configuration of the strain generative body

A strain generative body is used for applying an external force to the working point P of the substrate 10. The strain generative bodies 80 shown in FIGS. 13 to 15 are those in the conventional detector. However, when such a strain generative body is used, there is produced a considerable difference between detection sensitivities of respective axial components as described as the above-described problem (4) in "BACKGROUND OF THE INVENTION". Actually, the detection sensitivity of Fx or Fy would be equal to one tenth than that of Fz.

By using the strain generative body of the invention according to this application, the problems as described above can be solved. The configuration of the strain generative body will now be described in accordance with the embodiment in which the substrate 10 is bonded to the strain generative body. For the purpose of allowing the figure to be easy to see, an example using, as the substrate 10, a substrate of the type including quadrant shaped through holes as shown in FIG. 16c is shown. It is needless to say that substrates of any other type may be used.

Figure 18:
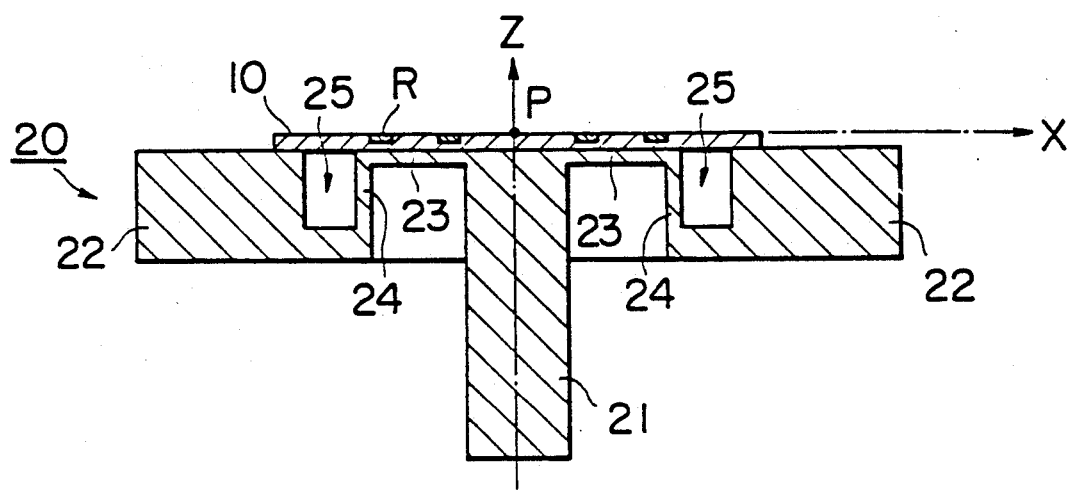
FIG. 18 is a side cross sectional view of a force detector according to an embodiment of this invention.
Figure 19:
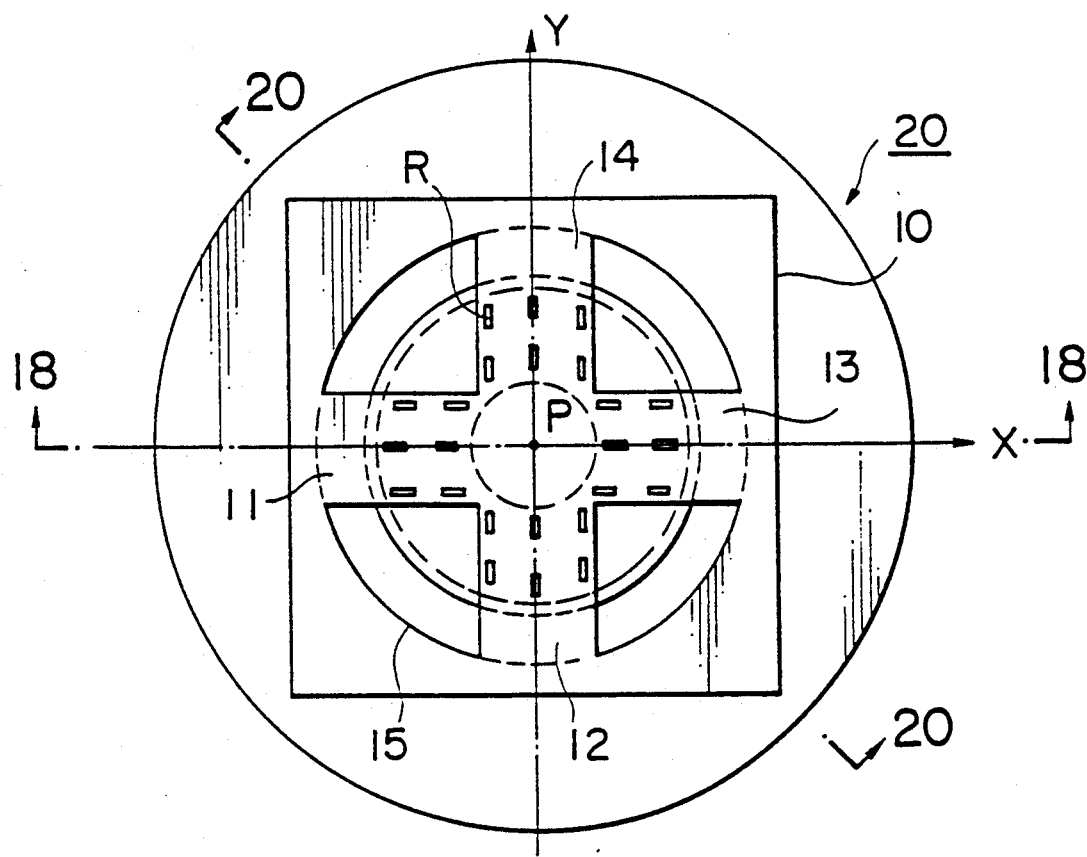
FIG. 19 is a top view of the force detector shown in FIG. 18.
Figure 20:
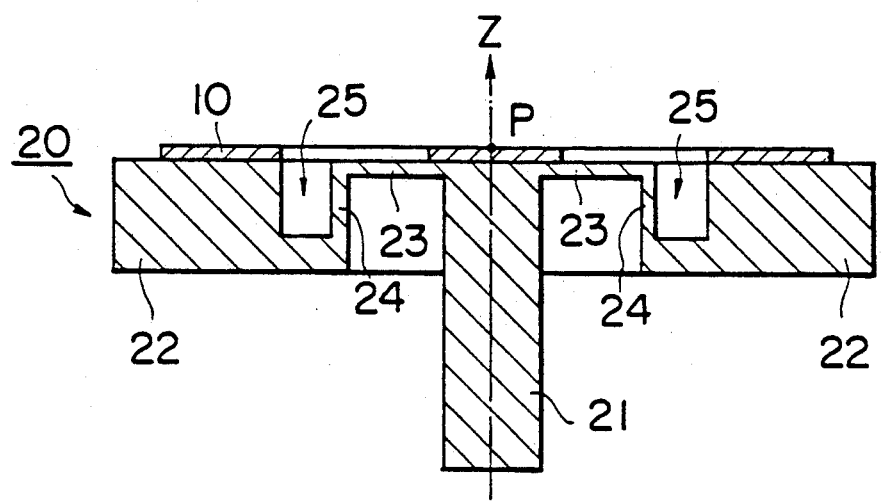
FIG. 20 is a side cross sectional view cut along the cutting line 20—20 of the force detector shown in FIG. 19.

FIG. 18 is a side cross sectional view of a force detector according to an embodiment of this invention, and FIG. 19 is a top view of the above detector. This detector is roughly composed of two components of a semiconductor substrate 10 and a strain generative body 20. An actual product requires, in addition to the above components, elements such as a cover for protecting the upper surface of the semiconductor substrate 10, a housing for accommodating the detector, and an electrical wiring, etc. However, the description of these attachments will be omitted for convenience. A working point P is defined at the central portion on the upper surface of the semiconductor substrate 10, and an XYZ three-dimensional coordinate system is defined as shown using the working point P as the origin. Thus, the upper surface of the semiconductor substrate 10 is just included in the XY plane. The cross sectional view cut along the X-axis of the detector shown in FIG. 19 corresponds to the side cross sectional view of FIG. 18. For further clarifying the structure of the semiconductor substrate 10, the side cross sectional view cut along the cutting line 20—20 of the detector shown in FIG. 19 is shown in FIG. 20. In addition, for further clarifying the structure of the strain generative body 20, the top view of only the strain generative body 20 is shown in FIG. 21.

Figure 21:
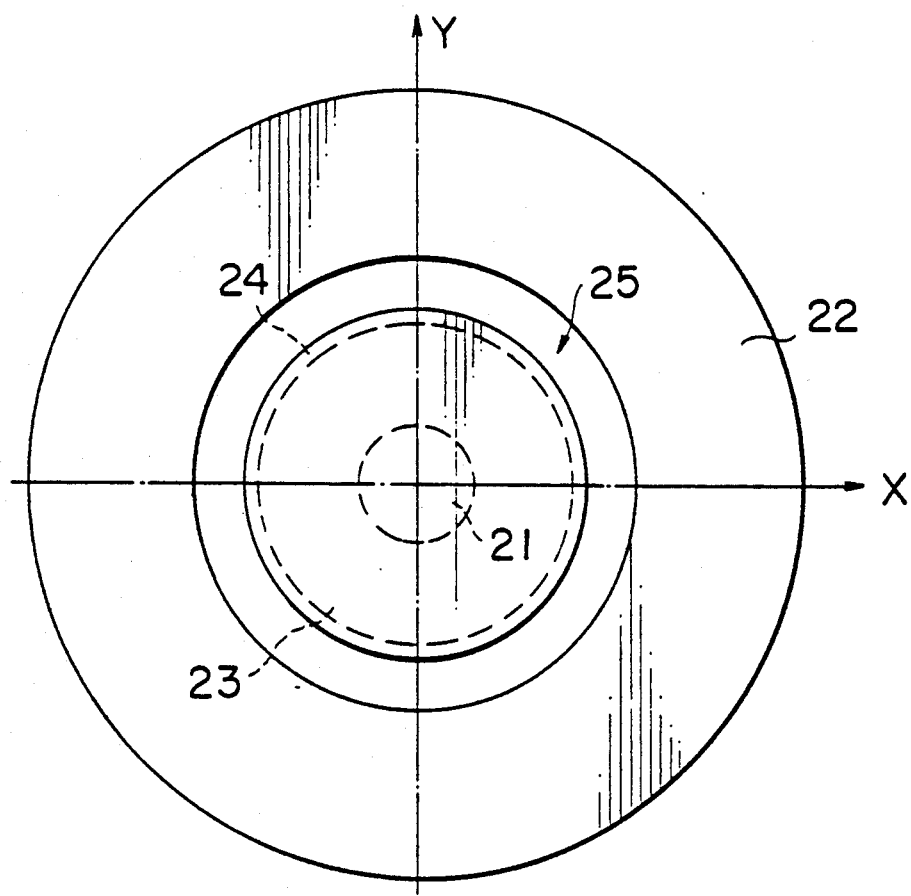
FIG. 21 is a top view of a strain generative body used in the force detector shown in FIG. 18.

The structure of the strain generative body 20 will be readily understood by making a reference to the side cross sectional view of FIG. 20 and the top view of FIG. 21. The entirety of the strain generative body is substantially disk-shaped. The central working portion 21 is projected downwardly, and the force detection is actually made by applying an external force to the lower end of the working portion 21. The upper end of the working portion 21 is bonded to the lower surface of the semiconductor substrate 10. On the other hand, the fixed portion 22 therearound is ordinarily fixed to a housing for accommodating the detector. The upper surface of the fixed portion 22 is fixed to the lower surface of the semiconductor substrate 10. Between the working portion 21 and the fixed portion 22, an annular flat plate portion 23 and a tubular portion 24 are provided. The annular flat plate portion 23 is formed as a portion in the form of washer. This portion 23 extends along the XY plane and is thin in thickness, and is provided at the position surrounding the periphery of the Z-axis. The tubular portion 24 is cylindrical about the Z-axis and is thin in thickness. Since the above-mentioned tubular portion 24 is formed, an annular groove 25 is formed on the side of the upper surface of the strain generative body 20. As stated above, the strain generative body 20 is composed of working portion 21, annular flat plate portion 23, tubular portion 24, and fixed portion 22 from the center toward the periphery in order recited. These respective portions are not discrete parts, but serve as a portion of the strain generative body integrally constructed. It is preferable that Korar (registered trademark, an alloy of iron, cobalt and nickel) is used as the material of the strain generative body 20. When the fixed portion 22 of the strain generative body 20 is fixed to apply an external force to the working point 21, there occurs bending in the annular flat plate portion 23 and the tubular portion 24. As a result, the strain generative body itself is deformed. Such a deformation is transmitted to the semiconductor substrate 10. Thus, a force corresponding to this deformation is detected.

As described above, this detector can detect forces in three axial directions and moments about three axes with respect to the working point P. The role of the strain generative body 20 is to transmit a force applied to the lower end of the working portion 21 to the working point P to produce displacements in three axial direction and rotational strains about three axes. At this time, when easinesses of such displacements or strains is different with respect to all axes, it results that detection sensitivities would be different with respect to all axes. An employment of the strain generative body of the above-described structure permits easinesses of displacements or strains with respect to respective axes to be substantially uniform. The reason thereof will be described below.

Figure 22:
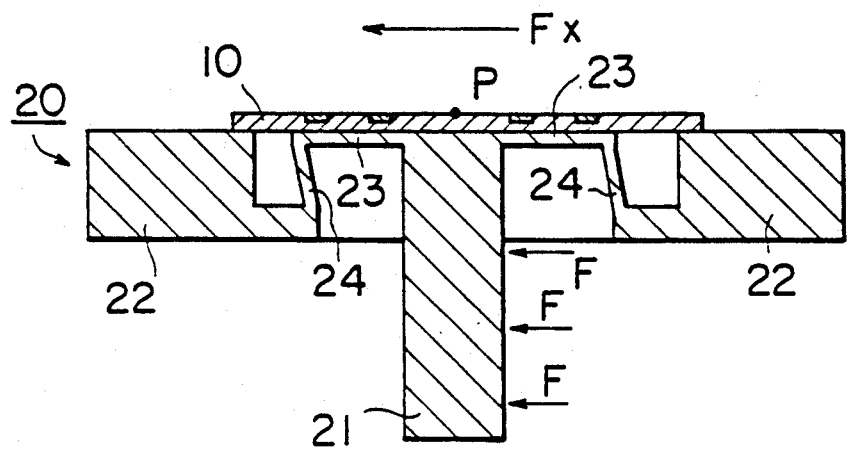
FIG. 22 is a side cross sectional view showing the state where a force Fx in the X-axis direction is applied to the force detector shown in FIG. 18.

FIG. 22 is a side cross sectional view showing how the strain generative body 20 is deformed when a force Fx in the X-axis direction is applied to the working point P. Such a deformation is obtained by applying a force as shown to the working portion 21. In this case, the tubular portion 24 is bent as shown, so the strain generative body 20 is mechanically deformed. This deformation is transmitted to the semiconductor substrate 10. Since the tubular portion 24 is formed thin in thickness, it can be easily bent in the X-axis direction. Accordingly, this detector exhibits a sufficient detection sensitivity with respect to the force Fx. It is to be noted that when a force Fy in the Y-axis direction is applied, entirely the same action as stated above is carried out. Thus, this detector exhibits a sufficient detection sensitivity with respect to the force Fy.

Figure 23:
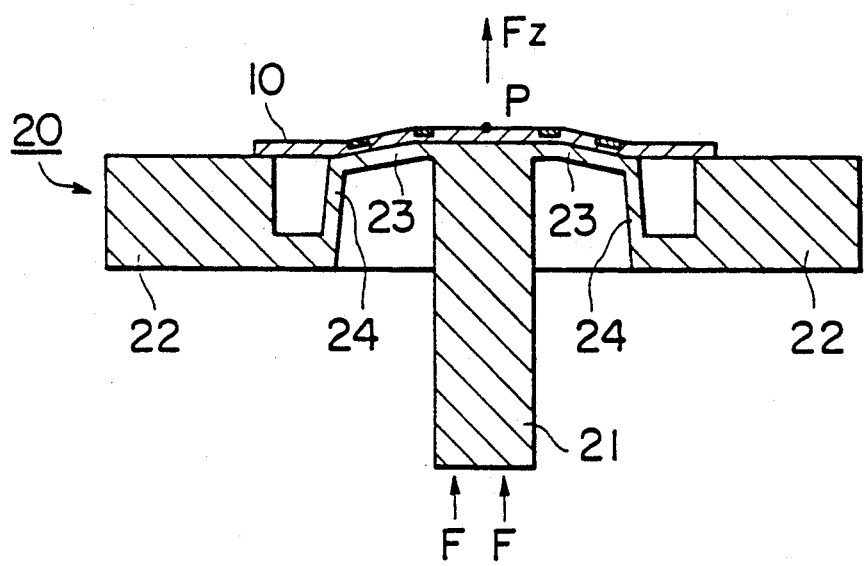
FIG. 23 is a side cross sectional view showing the state where a force Fz in the Z-axis direction is applied to the force detector shown in FIG. 18.

FIG. 23 is a side cross sectional view showing how the strain generative body 20 is deformed when a force Fz in the Z-axis direction is applied to the working point P. Such a deformation is obtained by applying a force as shown to the working portion 21. In this case, the annular flat plate portion 23 is bent as shown, so the strain generative body 20 is mechanically deformed. Thus, this deformation is transmitted to the semiconductor substrate 10. Since the annular flat plate portion 23 is formed thin in thickness, it can be easily bent in the Z-axis direction. Accordingly, this detector exhibits a sufficient detection sensitivity with respect to the force Fz.

Figure 24:
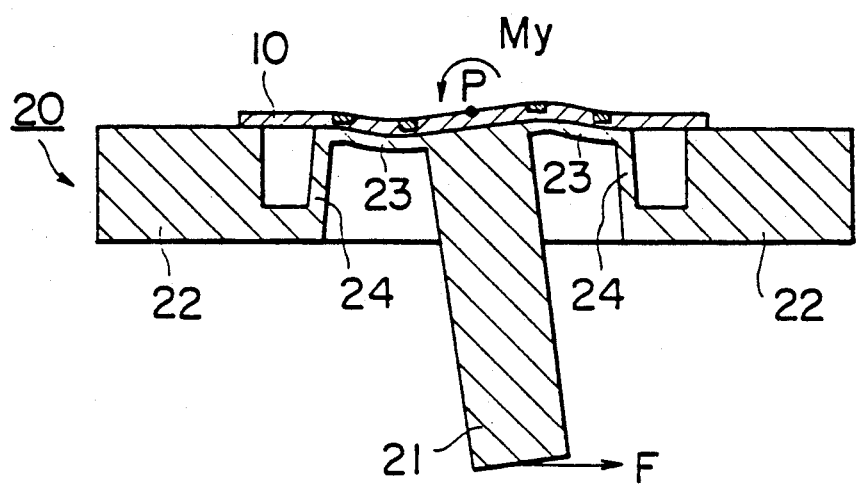
FIG. 24 is a side cross sectional view showing the state where a moment My about the Y-axis is applied to the force detector shown in FIG. 18.

FIG. 24 is a top view showing how the strain generative body 20 and the semiconductor substrate 10 are deformed when a moment about the Y-axis is applied to the working portion P. Such a deformation is obtained by applying a force F as shown to the bottom portion of the working portion 21. In this case, the annular flat plate portion 23 is bent as shown, so the strain generative body 20 is mechanically deformed. This deformation is transmitted to the semiconductor substrate 10. Since the annular flat plate portion 23 is formed thin in thickness, it can be easily bent in such a direction. Accordingly, this detector exhibits a sufficient detection sensitivity with respect to the moment My. In addition, when a moment Mx about the X-axis is applied the action is entirely the same as stated above. Thus, the detector has a sufficient detection sensitivity also with respect to the moment Mx.

Figure 25:
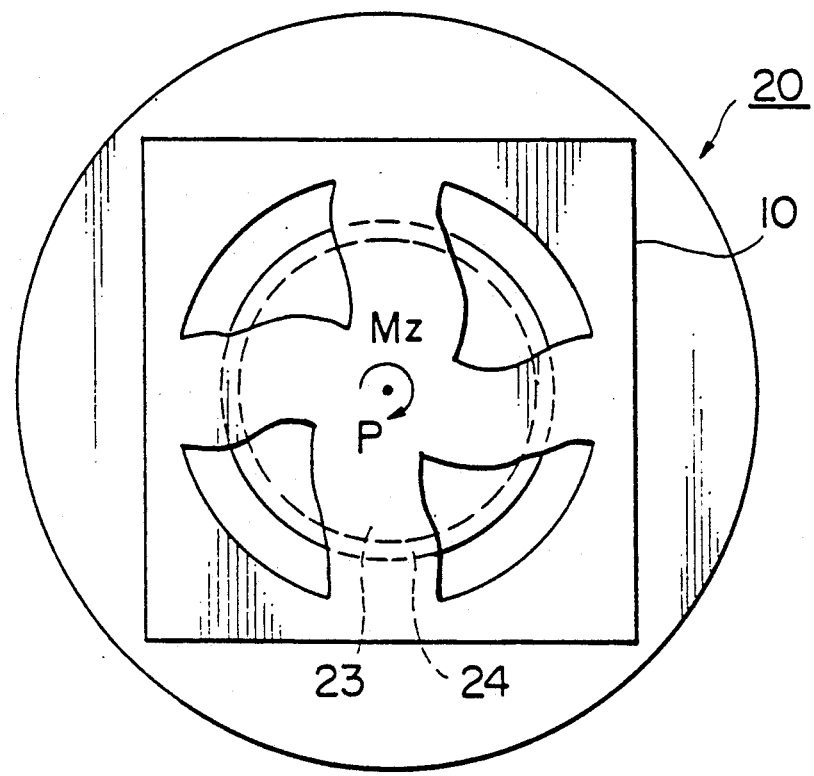
FIG. 25 is a top view showing the state where a moment Mz about the Z-axis is applied to the force detector shown in FIG. 18.

FIG. 25 is a top view showing how the strain generative body 20 and the semiconductor substrate 10 are deformed when a moment Mz about the Z-axis is applied to the working point P. Such a deformation is obtained by applying a force to twist the working portion 21 about the Z-axis. In this case, the tubular portion 24 is bent in a twisting direction, so the strain generative body 20 is mechanically deformed. This deformation is transmitted to the semiconductor substrate 10. Since the tubular portion 24 is formed thin in thickness, it can be easily bent in such a twisting direction. Accordingly, this detector exhibits a sufficient detection sensitivity with respect to a moment Mz.

In short, since the strain generative body 20 shown here is provided with the annular flat plate portion 23 as a first flexible portion having a sufficient flexibility with respect to the Z-axis direction and the tubular portion 24 as a second flexible portion having a sufficient flexibility with respect to the direction perpendicular to the Z-axis, even if a force in any axial direction is applied, or a moment about any axis is applied, the strain generative body can be sufficiently deformed. Accordingly, with this force detector, substantially uniform detection sensitivity can be provided with respect to respective axes.

§6 Other embodiments of the strain generative body

Figure 26:
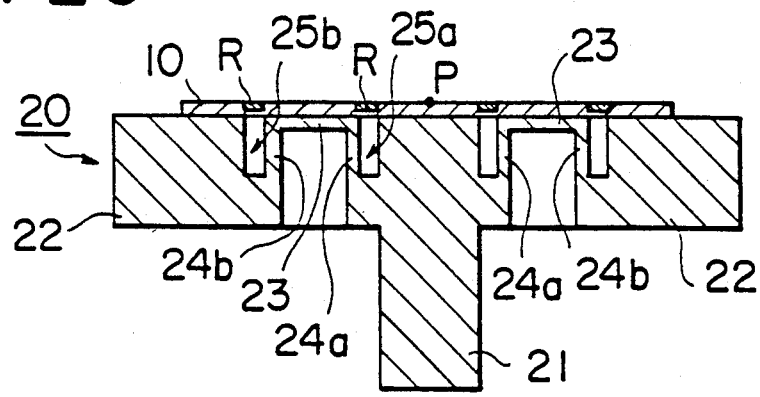
FIG. 26 is a side cross sectional view of a force detector according to another embodiment of this invention.
Figure 27:
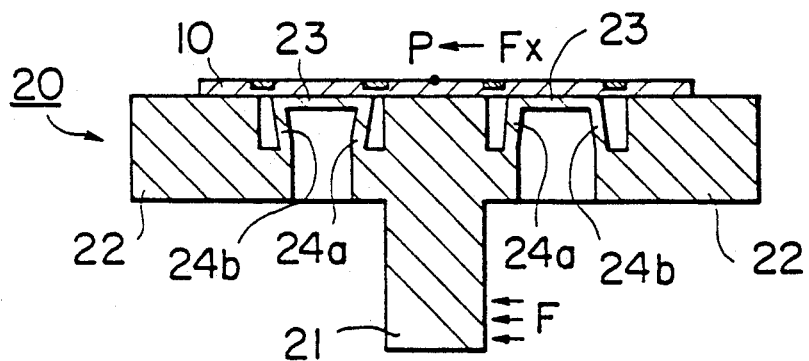
FIG. 27 is a side cross sectional view showing the state where a force Fx in the X-axis direction is applied to the force detector shown in FIG. 26.
Figure 28:
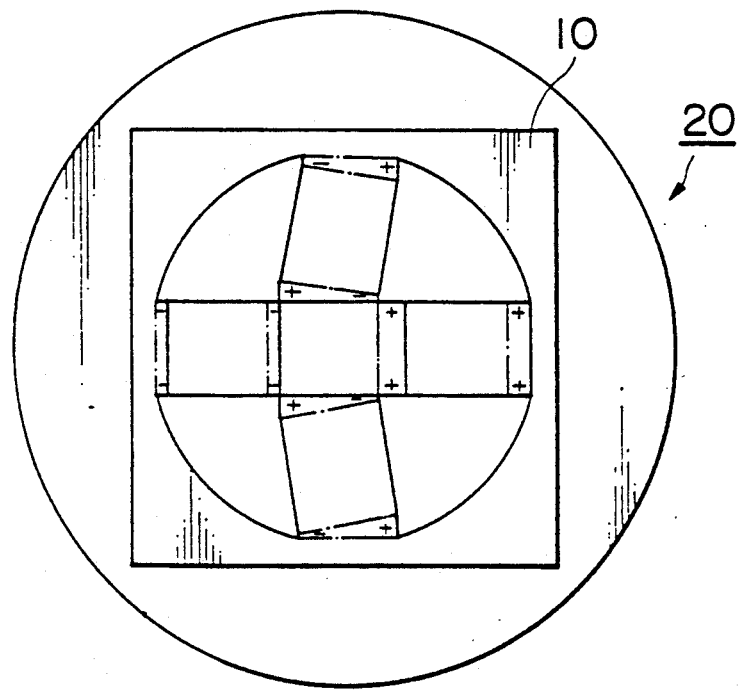
FIG. 28 is a top view showing the state where a force Fx in the X-axis direction is applied to the force detector shown in FIG. 26.

The cross sectional view of a force detector according to another embodiment of this invention is shown in FIG. 26. A strain generative body 20 of this detector is provided with two wall portions 24a and 24b. This embodiment differs from the above-described embodiment in this respect. For this reason, two kinds of grooves 25a and 25b are formed accordingly. FIGS. 27 and 28 are a side cross sectional view and a top view showing the state of deformation when a force Fx in the X-axis direction is applied, respectively. As shown in FIG. 28, the strain generative body 20 has four through-holes of quadrant instead of grooves to form bridge portions. Therefore wall portions 24a and 24b do not form a whole annular tube. Since two wall portions 24a and 24b are both bent, deformation is more easily produced. By this deformation, the portion indicated by the mark "+" is expanded, while the portion indicated by the mark "−" is contracted. The most conspicuous positions of the expansion/contraction are the position immediately above the grooves. Accordingly, it is preferable for improving the sensitivity to form resistance elements R immediately above the grooves 25a and 25b, respectively.

Figure 29:
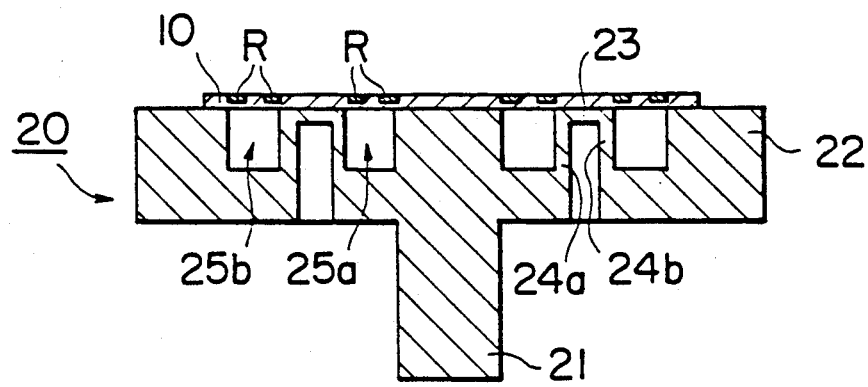
FIGS. 29 and 30 are a side cross sectional view and a top view of a force detector according to a further embodiment of this invention, respectively.
Figure 30:
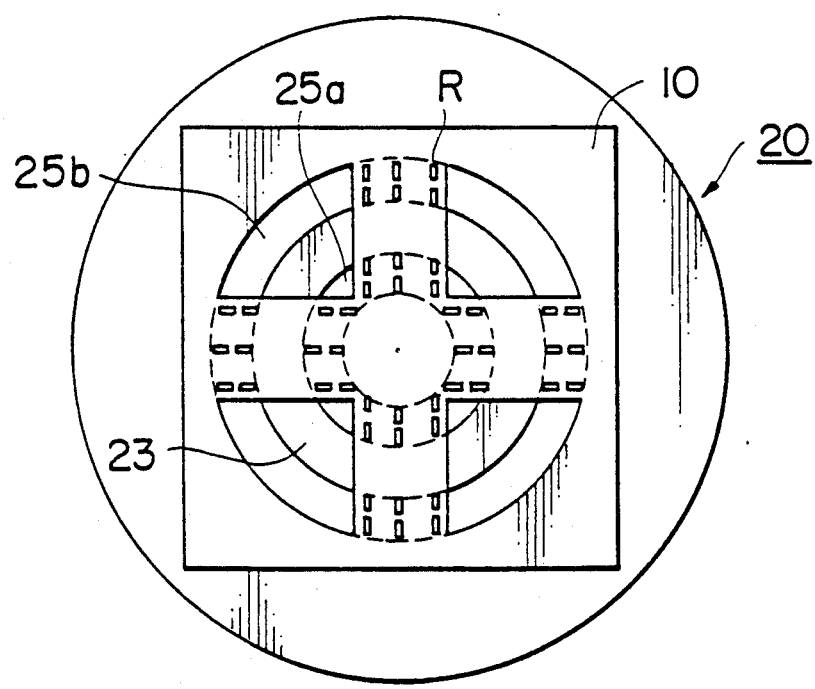

The embodiment showing the side cross sectional view in FIG. 29 and the top view in FIG. 30 is the same as the embodiment shown in FIG. 26 in the structure of the strain generative body 20, but differs from the latter in that twenty four sets of resistance element groups are arranged over respective annular grooves, thus to provide forty eight sets of resistance element groups in total. Thus, force detection can be made with a still more higher precision.

Figure 31:
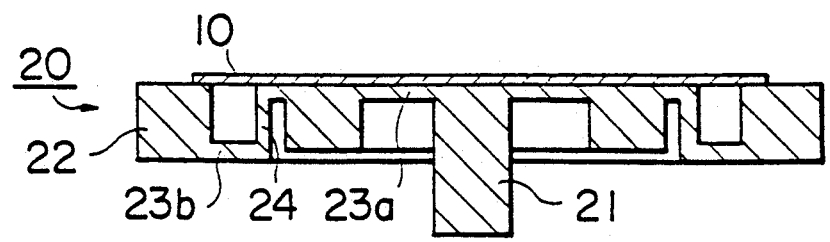
FIGS. 31 and 32 are side cross sectional views of a force detector according to a still further embodiment of this invention.
Figure 32:
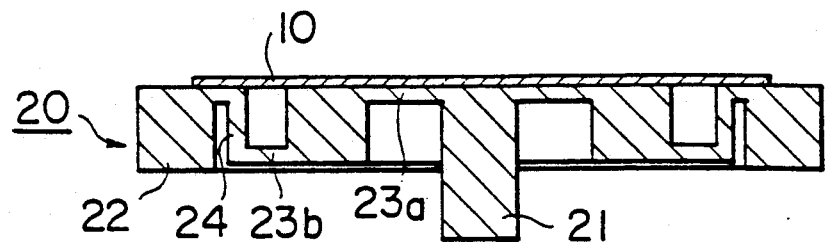

The embodiment showing the side cross sectional view in FIGS. 31 and 32 is characterized in that two annular flat plate portions 23a and 23b are provided.

Figure 33:
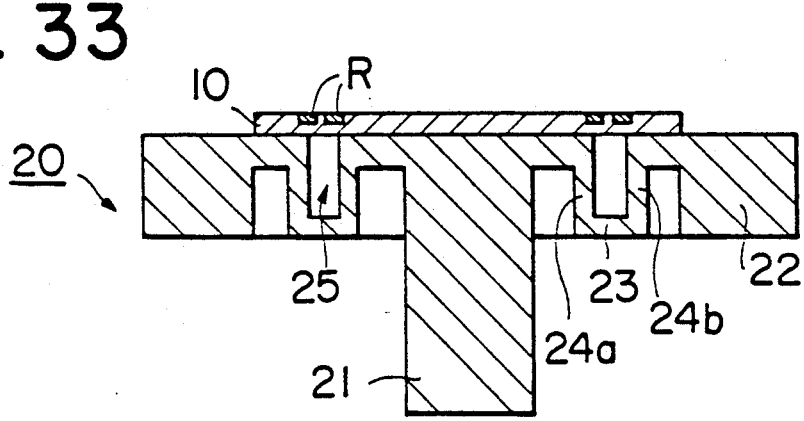
FIGS. 33 and 34 are a side cross sectional view and a top view of a force detector according to a still more further embodiment of this invention, respectively.
Figure 34:
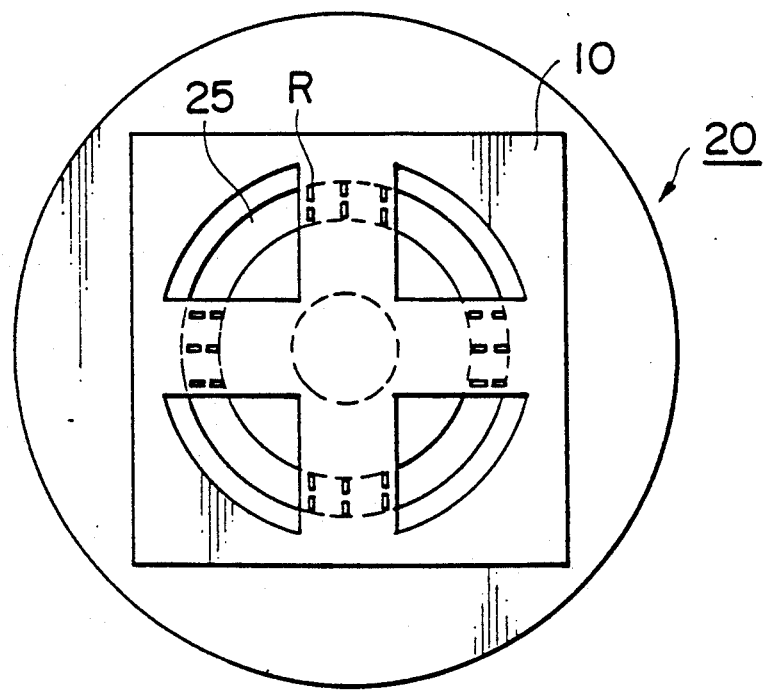

The embodiment showing the side cross sectional view in FIG. 33 and the top view in FIG. 34 is characterized in that there are included two tubular portions 24a and 24b to arrange all the resistance element groups on the annular grooves 25 formed therebetween.

Figure 35:
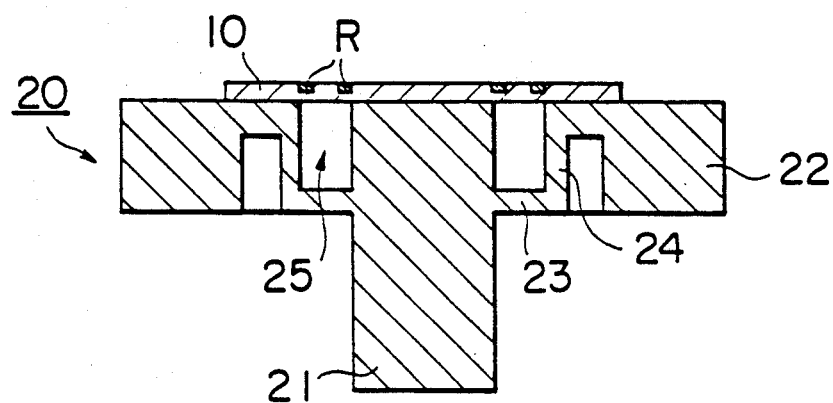
FIGS. 35 and 36 are a side cross sectional view and a top view of a force detector according to a further different embodiment of this invention, respectively.
Figure 36:
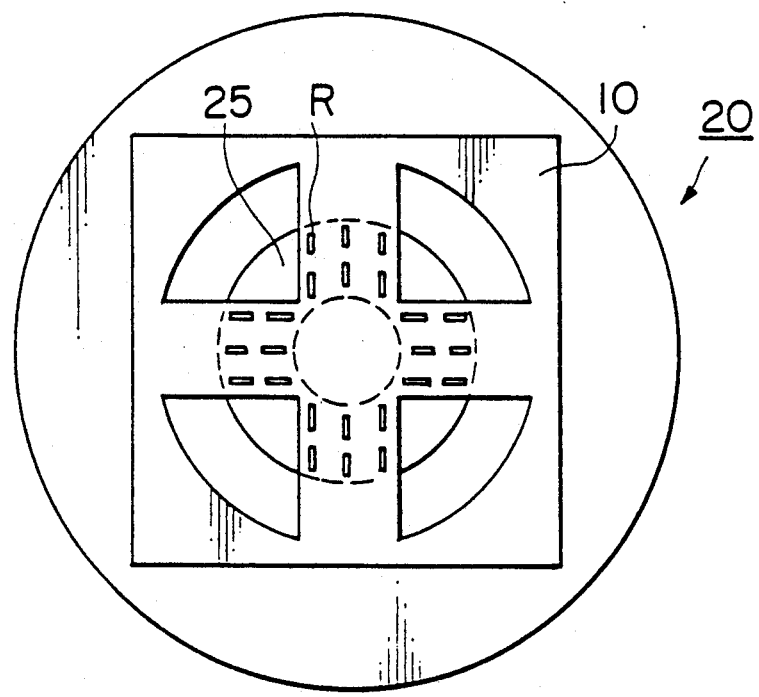

The embodiment showing the side cross sectional view in FIG. 35 and the top view in FIG. 36 is characterized in that all the resistance element groups are arranged over the annular groove formed in the vicinity of the working portion 21.

Figure 37:
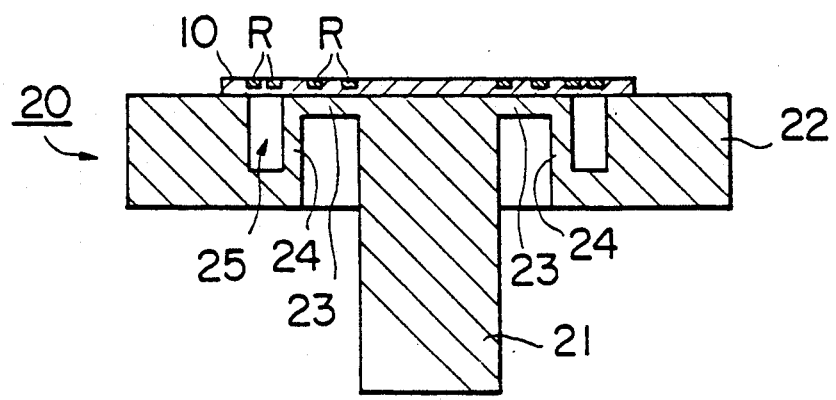
FIGS. 37 and 38 are a side cross sectional view and a top view of a force detector according to a still further different embodiment of this invention, respectively.
Figure 38:
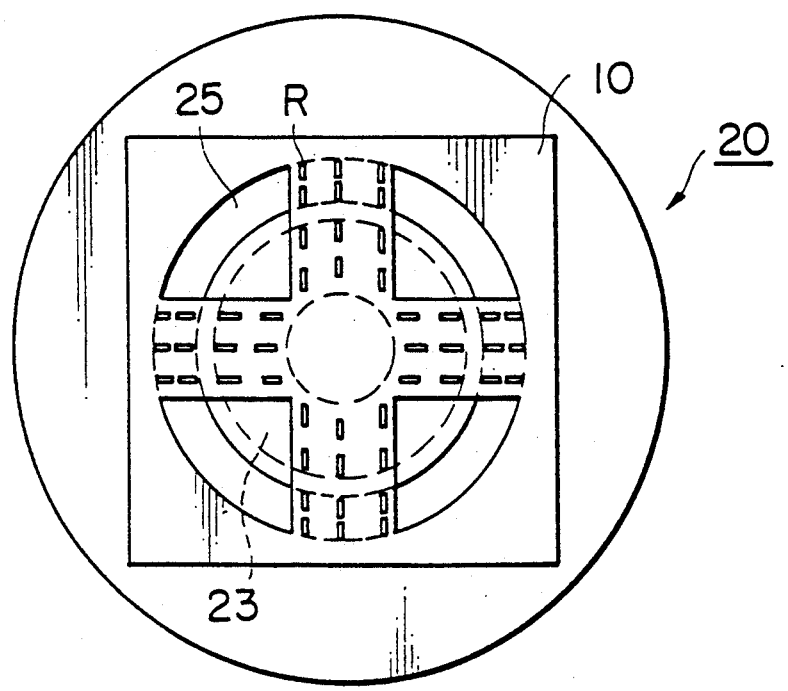

The embodiment showing the side cross sectional view in FIG. 37 and the top view in FIG. 38 is characterized in that twenty four sets of resistance element groups are arranged over the annular groove 25 and different twenty four sets of resistance element groups are arranged on the annular flat plate portion 23.

It is to be noted that in FIGS. 18 to 38, reference symbol R does not indicate a single resistance element, but it indicates a group of resistance elements as shown in FIG. 3.

Figure 39:
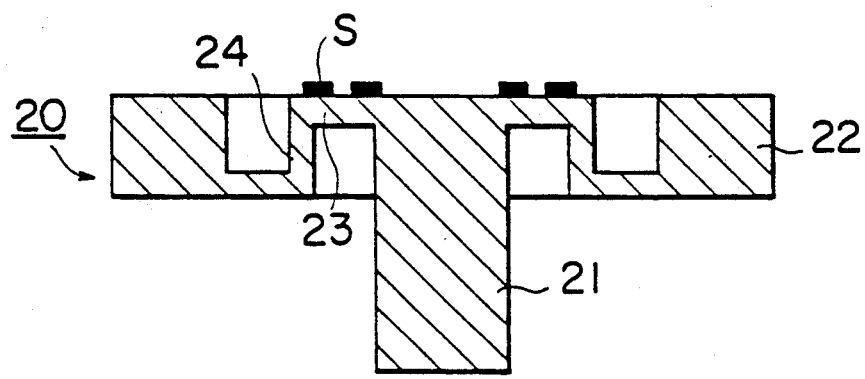
FIGS. 39 and 40 are cross sectional views showing an embodiment according to this invention using a strain gauge as a resistance element.
Figure 40:
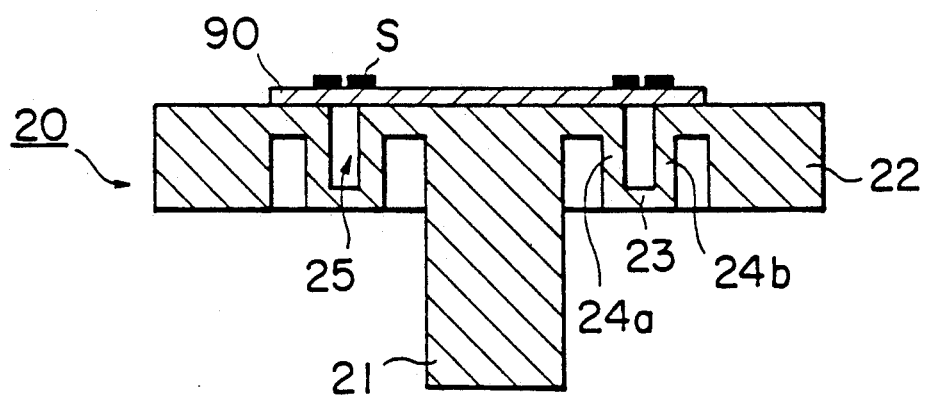

While resistance elements are formed on the semiconductor substrate in all the above-described embodiments, this invention is not limited to force detectors using such substrates. This invention is also applicable to, e.g., a detector using a strain gauge as the resistance element. The embodiment showing the side cross sectional view in FIG. 39 is characterized in that strain gauges S are directly stuck on the upper surface of the strain generative body 20 of the same structure as that of the embodiment shown in FIG. 18. The arrangement of a plurality of strain gauges S and the bridge circuit configuration are those of the embodiment shown in FIG. 18. Further, the embodiment showing the side cross sectional view in FIG. 40 is characterized in that a flat plate 90 is bonded on the upper surface of the strain generative body 20 of the same structure as that of the embodiment shown in FIG. 33 and strain gauges S are stuck on the upper surface of the flat plate 90. The arrangement of a plurality of strain gauges S and the bridge circuit configuration are the same as those of the embodiment shown in FIG. 33. In such detectors using the strain gauge S as the resistance element, it is unnecessary to use the semiconductor substrate. For the material of the strain generative body 20 or the flat plate 90, most typical metal may be satisfactorily used because it is unnecessary to take matching with the semiconductor substrate into consideration. In this embodiment, high strength aluminum is used as the material of the strain generative body 20 and the flat plate 90, and the both members are brazed to each other. For sticking strain gauges S onto these members, a bonding agent of phenol system or epoxy system may be used. When insulator is used for the flat plate 90, it is possible to form a poly-silicon layer having the property of the piezo resistance effect or a micro-crystal silicon layer on the surface of the plate 90 with a desired pattern to form resistance elements using a semiconductor processing technique.

Figure 41:
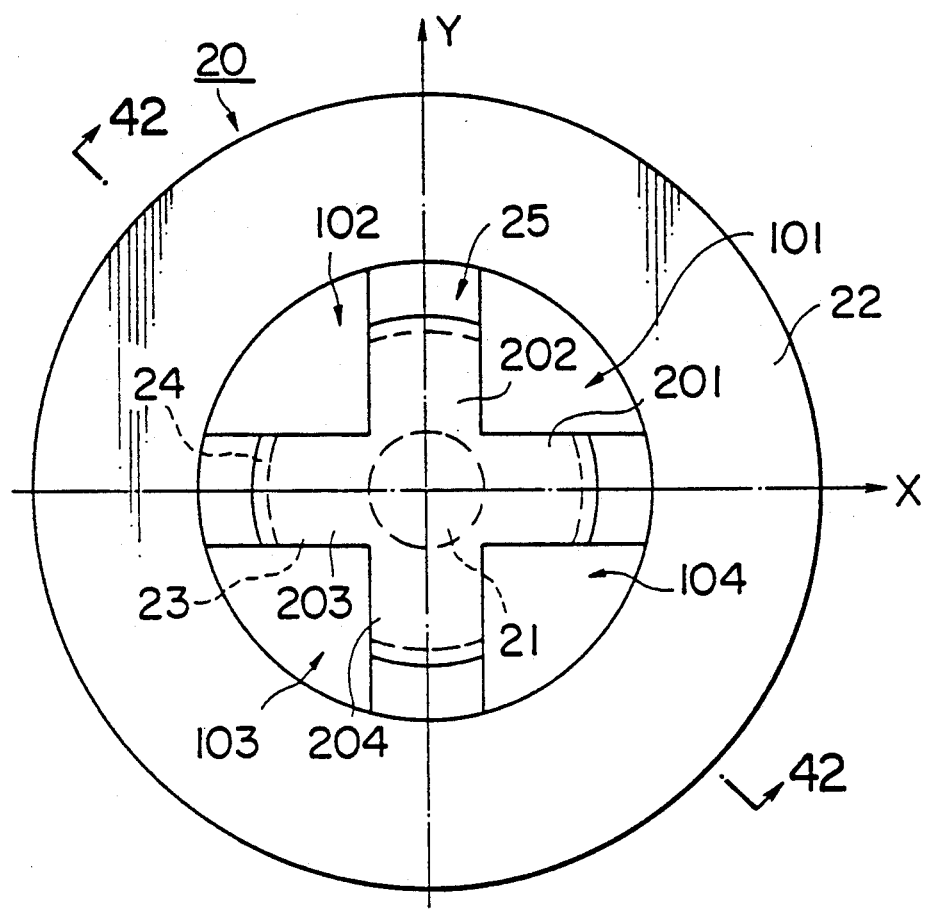
FIG. 41 is a top view of a strain generative body having through-holes.
Figure 42:
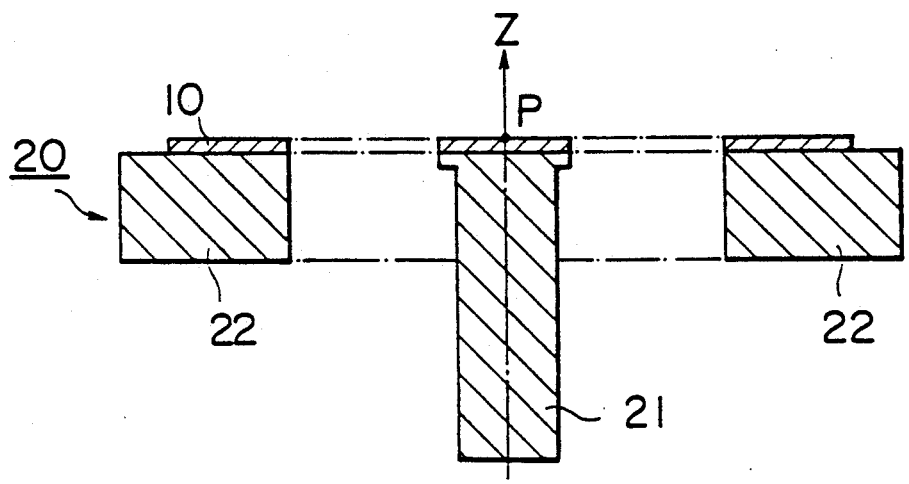
FIGS. 42 is a cross sectional view (only cross section is illustrated) of a force detector using a strain generative body shown in FIG. 41, and FIGS. 43 and 44, are top views of force detectors using a strain generative body having through-holes.

An embodiment shown in FIGS. 41 and 42 (only cross section is illustrated) is exactly the same as the embodiment shown in FIGS. 18 to 21 except that the strain generative body 20 comprises four quadrant through-holes 101 to 104 to form four bridge portions 201 to 204. FIG. 41 shows only the strain generative body. The cross section cut along the X-axis is identical with FIG. 18, where the substrate is also shown.

Figure 43:
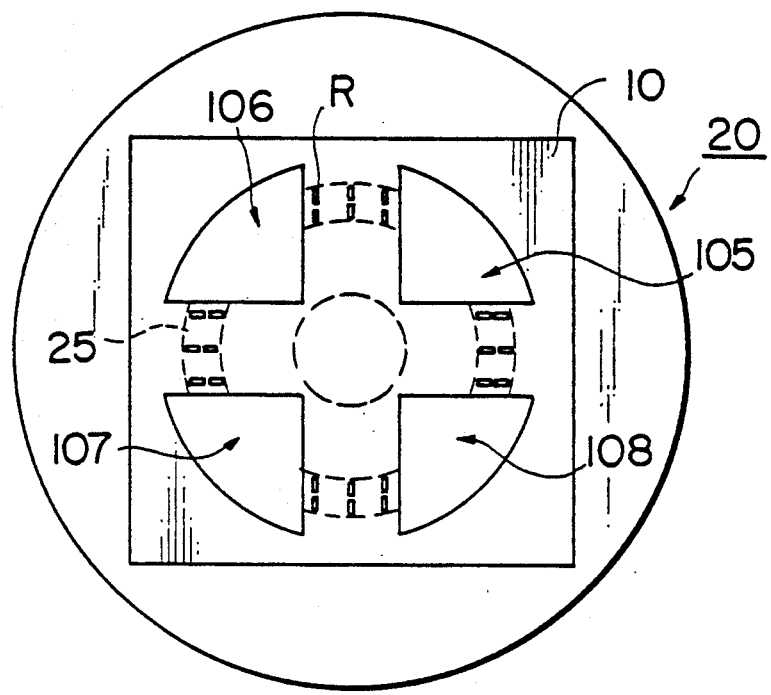
Figure 44:
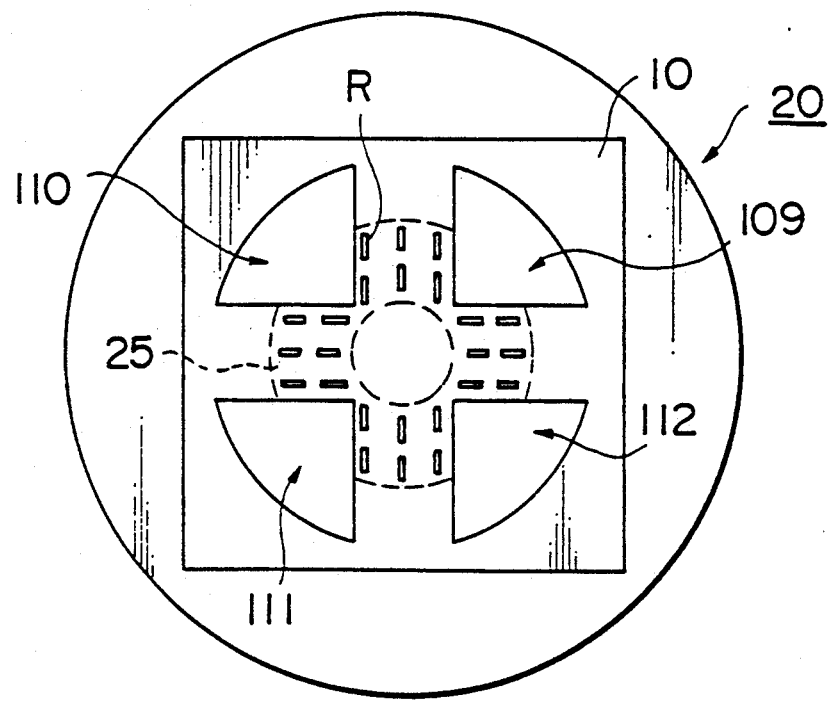

An embodiment shown in FIG. 43 is exactly the same as the embodiment shown in FIG. 34 and an embodiment shown in FIG. 44 is exactly the same as the embodiment shown in FIG. 36, except that the strain generative body 20 comprises four quadrant through-holes 105 to 108 and 109 to 112, respectively.

As described above, the force detector according to this invention is constructed so that the strain generative body is provided with a first flexible portion having a sufficient flexibility with respect to the Z-axis direction and a second flexible portion having a sufficient flexibility with respect to the direction perpendicular to the Z-axis. Accordingly, even if a force in any axial direction is applied, or even if a moment about any axis is applied, the strain generative body can be sufficiently deformed. Thus, substantially uniform detection sensitivity can be provided with respect to respective axes.

What is claimed is:

1. A force detector for detecting a force exerted in an X-axis direction using an origin (P) as a working point in an XYZ three-dimensional coordinate system,
   wherein there are provided bridge portions (12, 14) formed along a Y-axis on both sides of said origin, respectively,
   wherein both ends of each bridge portion are fixed as a fixed portion so that a strain is produced in each bridge portion by applying a force in the X-axis direction to said origin,
   wherein resistance element groups each comprised of a plurality of resistance elements having a property such that an electric resistance varies due to a mechanical deformation are provided on said bridge portions, on an XY plane of said three-dimensional coordinate system, a half of said groups being provided on a first area near to the origin and the other half of said groups being provided on a second area near to the fixed portion,
   a pair of groups (R20, R24) being located along a positive side of the Y-axis on said first area and one being opposite to the other with respect to the Y-axis,
   a pair of groups (R8, R12) being located along a negative side of the Y-axis on said first area and one being opposite to the other with respect to the Y-axis,
   a pair of groups (R19, R23) being located along the positive side of the Y-axis on said second area and one being opposite to the other with respect to the Y-axis, and
   a pair of groups (R7, R11) being located along the negative side of the Y-axis on said second area and one being opposite to the other with respect to the Y-axis,
   wherein a resistance element of the resistance element group (R20) existing on said first area and on the first quadrant of the XY plane, and a resistance element of the resistance element group (R23) existing on said second area and on the second quadrant of the XY plane are connected in series to constitute a first side,
   wherein a resistance element of the resistance element group (R12) existing on said first area and on the fourth quadrant of the XY plane, and a resistance element of the resistance element group (R7) existing on said second area and on the third quadrant of the XY plane are connected in series to constitute a second side,
   wherein a resistance element of the resistance element group (R24) existing on said first area and on the second quadrant of the XY plane, and a resistance element of the resistance element group (R19) existing on said second area and on the first quadrant of the XY plane are connected in series to constitute a third side,
   wherein a resistance element of the resistance element group (R8) existing on said first area and on the third quadrant of the XY plane, and a resistance element of the resistance element group (R11) existing on said second area and on the fourth quadrant of the XY plane are connected in series to constitute a fourth side, and
   wherein a bridge circuit is formed so that said first and second sides are opposite to each other, and that said third and fourth sides are opposite to each other with respect to these four sides, thus to detect a force exerted in the X-axis direction by a bridge voltage of said bridge circuit.

2. A force detector for detecting a force exerted in a Z-axis direction using an origin (P) as a working point in an XYZ three-dimensional coordinate system,
   wherein there are provided bridge portions (11, 13) formed along an X-axis on both sides of said origin, respectively,
   wherein both ends of each bridge portion are fixed as a fixed portion so that a strain is produced in each bridge portion by applying a force in the Z-axis direction to said origin,
   wherein resistance element groups each comprised of a plurality of resistance elements having a property such that an electric resistance varies due to a mechanical deformation are provided on said bridge portions, on a XY plane of said three-dimensional coordinate system, a half of said groups being provided on a first area near to the origin and the other half of said groups being provided on a second area near to the fixed portion,
   a first group (R16) being located on a positive side of the X-axis on said first area,
   a second group (R4) being located on a negative side of the X-axis on said first area,
   a third group (R15) being located on the positive side of the X-axis on said second area,
   a fourth group (R3) being located on the negative side of the X-axis on said second area,
   wherein one resistance element of said first resistance element group (R16) and one resistance element of said second resistance element group (R4) are connected in series to constitute a first side,
   wherein another resistance element of said first resistance element group (R16) and another resistance element of said second resistance element group (R4) are connected in series to constitute a second side, wherein one resistance element of said third resistance element group (R15) and one resistance element of said fourth resistance element group (R3) are connected in series to constitute a third side,
wherein another resistance element of said third resistance element group (R15) and another resistance element of said fourth resistance element group (R3) are connected in series to constitute a fourth side, and
wherein a bridge circuit is formed so that said first and second sides are opposite to each other, and that said third and fourth sides are opposite to each other with respect to these four sides, thus to detect a force exerted in the Z-axis direction by a bridge voltage of said bridge circuit.

3. A force detector for detecting a moment about an X-axis using an origin (P) as a working point in an XYZ three-dimensional coordinate system,
wherein there are provided bridge portions (12, 14) formed along a Y-axis on both sides of said origin, respectively,
wherein both ends of each bridge portion are fixed as a fixed portion so that a strain is produced in each bridge portion by applying a moment about the X-axis to said origin,
wherein resistance element groups each comprised of a plurality of resistance elements having a property such that an electric resistance varies due to a mechanical deformation are provided on said bridge portions, on an XY plane of said three-dimensional coordinate system, a half of said groups being provided on a first area near to the origin and the other half of said groups being provided on a second area near to the fixed portion,
a first group (R22) being located on a positive side of the Y-axis on said first area,
a second group (R10) being located on a negative side of the Y-axis on said first area,
a third group (R21) being located on a positive side of the Y-axis on said second area,
a fourth group (R9) being located on a negative side of the Y-axis on said second area,
wherein one resistance element of said first resistance element group (R22) and one resistance element of said fourth resistance element group (R9) are connected in series to constitute a first side,
wherein another resistance element of said first resistance element group (R22) and another resistance element of said fourth resistance element group (R9) are connected in series to constitute a second side,
wherein one resistance element of said second resistance element group (R10) and one resistance element of said third resistance element group (R21) are connected in series to constitute a third side,
wherein another resistance element of said second resistance element group (R10) and another resistance element of said third resistance element group (R21) are connected in series to constitute a fourth side, and
wherein a bridge circuit is formed so that said first and second sides are opposite to each other, and that said third and fourth sides are opposite to each other with respect to these four sides, thus to detect a moment exerted about the X-axis by a bridge voltage of said bridge circuit.

4. A force detector comprising:
a strain generative body (20) for mechanical deformation by a forced applied thereto,
said strain generative body (20) for mechanical deformation by a force applied thereto,
said strain generative body comprising:
a resistance element (R) formed on an upper surface of said strain generative body, said resistance element having a property such that an electric resistance thereof varies with said mechanical deformation,
whereby when an origin (P) is taken on said upper surface to define an XYZ three-dimensional coordinate system so that said upper surface is included in an XY plane of said three-dimensional coordinate system, said force detector is operative to detect said force in a coordinate axis direction or a moment about a coordinate axis using said origin as a working point,
a working portion (21) positioned below said origin for transmitting said applied force to said origin,
a fixed portion (22) for fixing the periphery of said strain generative body,
a first flexible portion formed between said working portion and said fixed portion and having flexibility with respect to a Z-axis direction, said first flexible portion being constituted by an annular flat plate portion (23) so as to surround the periphery of said Z-axis, said annular flat plate portion extending along a plane substantially perpendicular to said Z-axis and having a small thickness in said Z-axis direction, and
a second flexible portion formed between said working portion and said fixed portion and having flexibility with respect to a direction perpendicular to said Z-axis, said second flexible portion being constituted by a tubular portion (24) provided so as to surround the periphery of said Z-axis, said tubular portion extending along said Z-axis and having a small thickness in a direction perpendicular to the Z-axis.

5. A force detector as set forth in claim 4, wherein holes (101-104) are formed through said strain generative body (20) so as to form bridge portions (201-204) with a part between said holes.

6. A force detector as set forth in claim 5,
wherein a first region (13) along a positive part of an X-axis, a second region (11) along a negative part of the X-axis, a third region (14) along a positive part of an Y-axis and a fourth region (12) along a negative part of the Y-axis are defined on the XY-plane,
resistance elements being located in said first region, said second region, said third region and said fourth region so as to detect XYZ three-dimensional force components.

7. A force detector as set forth in claim 4,
wherein a first region (13) along a positive part of an X-axis, a second region (11) along a negative part of the X-axis, a third region (14) along a positive part of an Y-axis, and a fourth region (12) along a negative part of the Y-axis are defined on the XY-plane,
resistance elements being located in said first region, said second region, said third region and said fourth region so as to detect XYZ three-dimensional force components.

8. A force detector comprising:

a substrate (10) including a resistance element (R) formed on an upper surface thereof, said resistance element having a property such that an electric resistance thereof varies due to a mechanical deformation of said substrate, and a strain generative body (20) connected to a lower surface of said substrate in order to produce said mechanical deformation in said substrate when a force is applied to said strain generative body, whereby when an origin (P) is taken on said upper surface of said substrate to define an XYZ three-dimensional coordinate system so that said upper surface of said substrate is included in an XY plane of said three-dimensional coordinate system, said force detector is operative to detect said force in a coordinate axis direction or a moment about a coordinate axis using said origin as a working point, said strain generative body comprising:

a working portion (21) at a position below said original of said substrate for transmitting said force to said origin, a fixed portion (22) for fixing the periphery of said substrate, a first flexible portion formed between said working portion and said fixed portion and having flexibility with respect to a Z-axis direction of said Z-axis, said annular flat plate portion extending along a plane substantially perpendicular to said Z-axis and having a small thickness in said Z-axis direction, and a second flexible portion formed between said working portion and said fixed portion and having flexibility with respect to a direction perpendicular to said Z-axis, said second flexible portion being constituted by a tubular portion (24) provided so as to surround the periphery of said Z-axis, said tubular portion extending along said Z-axis and having a small thickness in a direction perpendicular to the Z-axis.

9. A force detector as set forth in claim 8, wherein holes (101–104) are formed through said strain generative body (20) so as to form bridge portions (201–204) with a part between said holes.

10. A force detector as set forth in claim 9, wherein a first region (13) along a positive part of an X-axis, a second region (11) along a negative part of the X-axis, a third region (14) along a positive part of an Y-axis and a fourth region (12) along a negative part of the Y-axis are defined on the XY-plane, resistance elements being located in said first region, said second region, said third region and said fourth region so as to detect XYZ three-dimensional force components.

11. A force detector as set forth in claim 8, wherein a first region (13) along a positive part of an X-axis, a second region (11) along a negative part of the X-axis, a third region (14) along a positive part of an Y-axis and a fourth region (12) along a negative part of the Y-axis are defined on the XY-plane, resistance elements being located in said first region, said second region, said third region and said fourth region so as to detect XYZ three-dimensional for components.

12. A force detector comprising:

a strain generative body (20) for producing a mechanical deformation, and a transducer for transforming said mechanical deformation into an electrical signal, whereby when an origin (P) is taken on a plane surface of said strain generative body to define an XYZ three-dimensional coordinate system so that said plane surface is included in an XY plane of said three-dimensional coordinate system, said force detector is operative to detect a force exerted about a coordinate axis using said origin as a working point, said strain generative body comprising:

a working portion (21) positioned below said origin and transmitting an applied force to said origin, a fixed portion (22) for fixing the periphery of said strain generative body, a first flexible portion formed between said working portion and said fixed portion and having flexibility with respect to a Z-axis direction, said first flexible portion being constituted by an annular flat plate portion (23) so as to surround the periphery of said Z-axis, said annular flat plate portion extending along a plane substantially perpendicular to said Z-axis and having a small thickness in said Z-axis direction, and a second flexible portion formed between said working portion and said fixed portion and having flexibility with respect to a direction perpendicular to said Z-axis, said second flexible portion being constituted by a tubular portion (24) provided so as to surround the periphery of said Z-axis, said tubular portion extending along said Z-axis and having a small thickness in a direction perpendicular to the Z-axis.

13. A force detector as set forth in claim 12, wherein holes (101–104) are formed through said strain generative body (20) so as to form bridge portions (201–204) with a part between said holes.

* * * * *